United States Patent
Tang

(10) Patent No.: US 11,985,309 B2
(45) Date of Patent: May 14, 2024

(54) PICTURE CODING METHOD, PICTURE DECODING METHOD, AND RELATED APPARATUSES

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 18/059,676

(22) Filed: Nov. 29, 2022

(65) Prior Publication Data
US 2023/0087855 A1 Mar. 23, 2023

Related U.S. Application Data

(63) Continuation of application No. PCT/CN2021/089664, filed on Apr. 25, 2021.

(30) Foreign Application Priority Data

May 29, 2020 (CN) .......................... 202010482658.6

(51) Int. Cl.
*H04N 19/105* (2014.01)
*H04N 19/117* (2014.01)
*H04N 19/119* (2014.01)
*H04N 19/159* (2014.01)
(Continued)

(52) U.S. Cl.
CPC ......... *H04N 19/105* (2014.11); *H04N 19/117* (2014.11); *H04N 19/119* (2014.11);
(Continued)

(58) Field of Classification Search
None
See application file for complete search history.

(56) References Cited

U.S. PATENT DOCUMENTS 10,419,757 B2 9/2019 Chen
2016/0105685 A1* 4/2016 Zou .................... H04N 19/176
375/240.12
(Continued)

FOREIGN PATENT DOCUMENTS

CN 109691102 A 4/2019
CN 110087083 A 8/2019
(Continued)

OTHER PUBLICATIONS

Dae-Yeon Kim. "CE3-related: CCLM with unified filter shape" Joint Video Experts Team (JVET) of ITU-T SG 16 WP 3 and ISO/IEC JTC I/SC 29/WG 11 16th Meeting, JVET-P0265, Sep. 24, 2019 (Sep. 24, 2019). 6 pages.
(Continued)

*Primary Examiner* — Lindsay J Uhl
(74) *Attorney, Agent, or Firm* — PERKINS COIE LLP

(57) ABSTRACT

A picture decoding method comprises: partitioning a picture is partitioned, and a luma component intra prediction mode and a chroma component intra prediction mode of the current coding block are determined; when the chroma component intra prediction mode indicates using a luma component of the current coding block to determine a prediction value of a chroma component of the current coding block, a prediction block of the chroma component of the current coding block is determined according to the luma component intra prediction mode; and prediction refinement is performed on the prediction block of the chroma component of the current coding block, so as to obtain a refined prediction block of the chroma component of the current coding block.

8 Claims, 11 Drawing Sheets

(51) Int. Cl.
H04N 19/172 (2014.01)
H04N 19/176 (2014.01)
H04N 19/186 (2014.01)

(52) U.S. Cl.
CPC ......... *H04N 19/159* (2014.11); *H04N 19/172* (2014.11); *H04N 19/176* (2014.11); *H04N 19/186* (2014.11)

(56) References Cited

U.S. PATENT DOCUMENTS

| | | | |
|---|---|---|---|
| 2018/0063527 A1 | 3/2018 | Chen et al. | |
| 2021/0092395 A1 | 3/2021 | Zhang et al. | |
| 2021/0314595 A1* | 10/2021 | Zhang | ................... H04N 19/50 |

FOREIGN PATENT DOCUMENTS

| | | |
|---|---|---|
| CN | 110839153 A | 2/2020 |
| CN | 110971897 A | 4/2020 |
| WO | 2020015648 A1 | 1/2020 |

OTHER PUBLICATIONS

International Search Report in the international application No. PCT/CN2021/089664, dated Jul. 7, 2021 with English translation (6 pages).

English translation of the Written Opinion of the International Search Authority in the international application No. PCT/CN2021/089664, dated Jul. 7, 2021. 7 pages.

\* cited by examiner

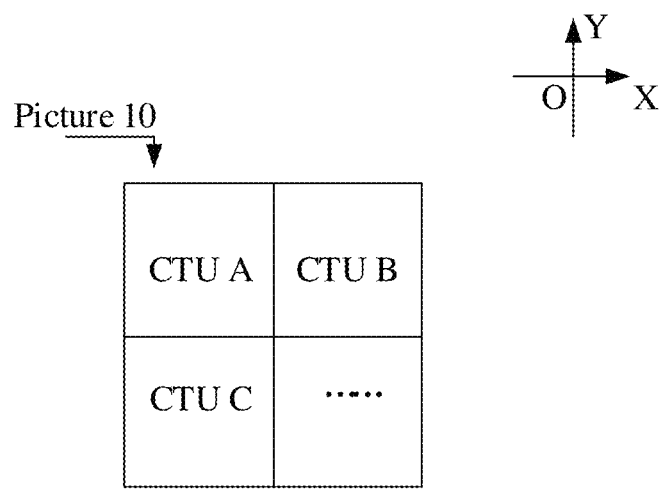
FIG. 1
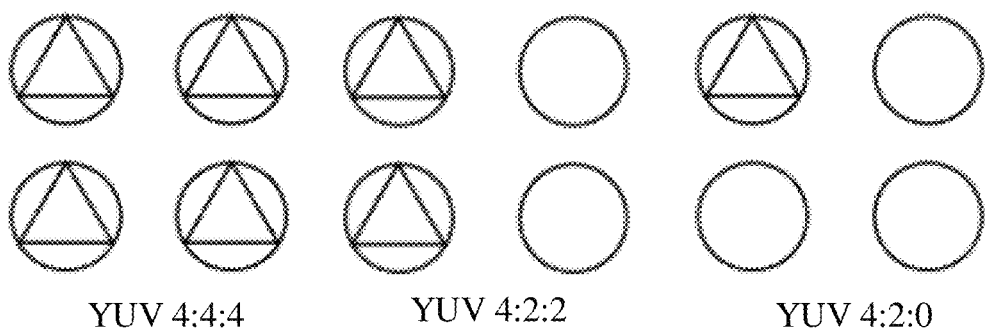
YUV 4:4:4　　　YUV 4:2:2　　　YUV 4:2:0
FIG. 2A　　FIG. 2B　　FIG. 2C
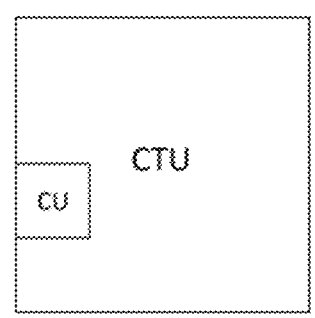
FIG. 3

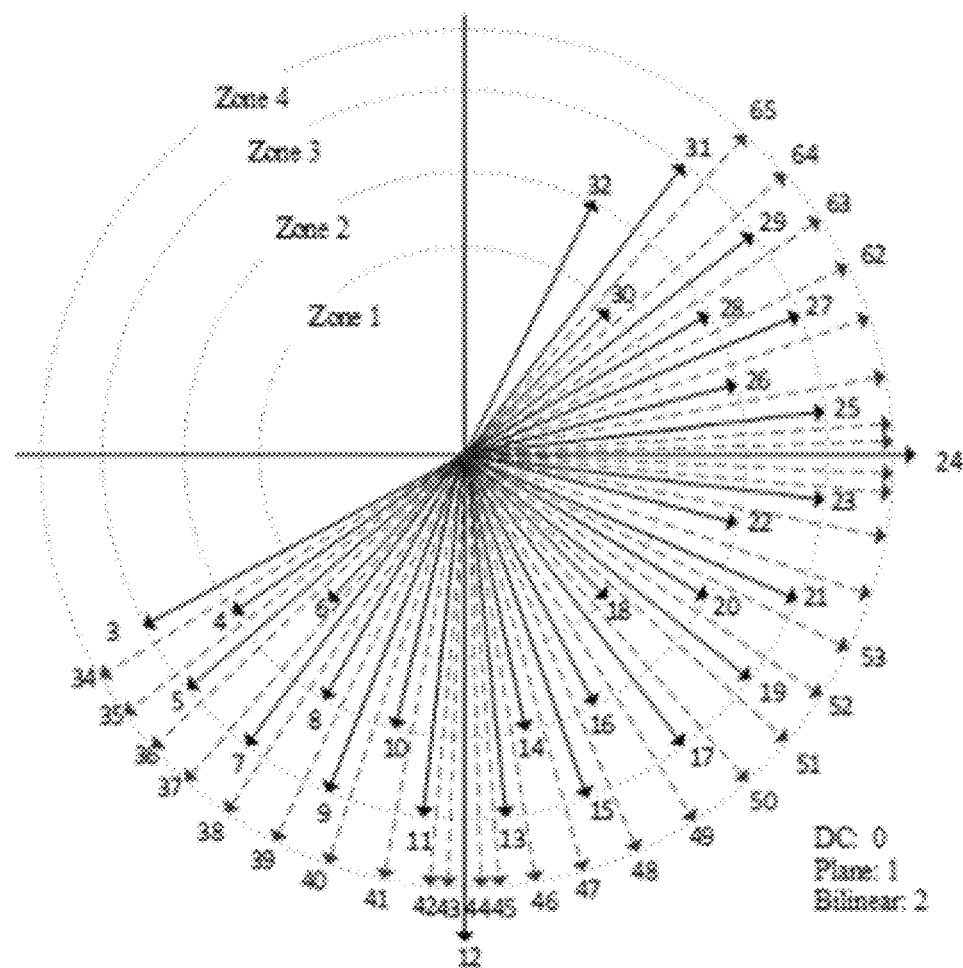
FIG. 5
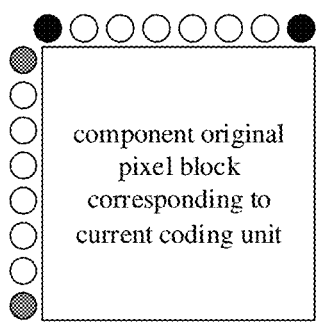
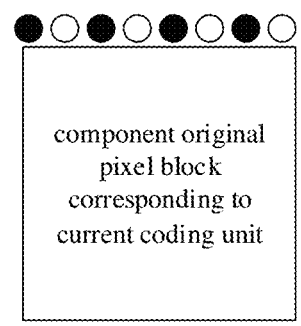
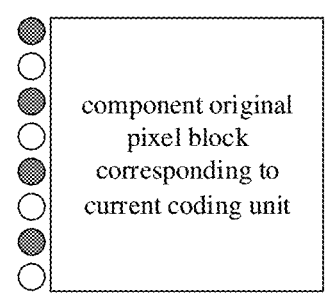
FIG. 6A　　　　　FIG. 6B　　　　　FIG. 6C Reconstructed block of luma component — Reference prediction block of chroma component — Prediction block of chroma component

PICTURE CODING METHOD, PICTURE DECODING METHOD, AND RELATED APPARATUSES

CROSS REFERENCE TO RELATED APPLICATIONS

This is a continuation of International Application No. PCT/CN2021/089664 filed on Apr. 25, 2021, and entitled "IMAGE ENCODING METHOD, IMAGE DECODING METHOD, AND RELATED APPARATUSES" which claims priority to Chinese Patent Application No. 202010482658.6 filed on May 29, 2020 and entitled "IMAGE ENCODING METHOD, IMAGE DECODING METHOD, AND RELATED APPARATUSES". The contents of the two applications are incorporated therein by reference in their entirety.

TECHNICAL FIELD

The present disclosure relates to the technical field of electronic devices, and specifically to a picture coding method, a picture decoding method, and related apparatuses.

BACKGROUND

Digital video capabilities can be incorporated into a wide range of apparatuses, including digital televisions, digital live streaming systems, wireless broadcasting systems, Personal Digital Assistants (PDAs), laptops or desktop computers, tablet computers, e-book readers, digital cameras, digital recording apparatuses, digital media players, video game apparatuses, video game consoles, cellular or satellite radio phones, video conferencing apparatuses, video streaming apparatuses, and the like.

The digital video apparatuses implement video compression technologies, such as those defined by the MPEG-2, MPEG-4, ITU-TH.263, ITU-TH.264/MPEG-4 Part 10 Advanced Video Coding (AVC), ITU-TH.265 High Efficiency Video Coding (HEVC) standards and described in the extension parts of the standards. The video apparatuses may transmit, receive, encode, decode and/or store digital video information by implementing these video coding technologies.

With the surge of Internet videos, higher requirements on the video compression ratio are still proposed despite the evolution of the digital video compression technologies.

BRIEF DESCRIPTION OF THE DRAWINGS

In order to illustrate the technical solutions in the embodiments of the present invention or technical solutions in the conventional technology more clearly, the drawings used in the technical description of the embodiments will be briefly described below. It is apparent that the drawings in the following descriptions are merely some embodiments of the present invention. Other drawings can be obtained from those skilled in the art according to these drawings without any creative work.

FIG. 1 is a schematic block diagram of a Coding Tree Unit (CTU) according to an embodiment of the present disclosure.

FIGS. 2A to 2C are schematic block diagrams of colour formats according to an embodiment of the present disclosure.

FIG. 3 is a schematic block diagram of a CTU and a Coding Unit (CU) according to an embodiment of the present disclosure.

FIG. 5 is a schematic block diagram of a luma component intra prediction mode according to an embodiment of the present disclosure.

FIGS. 6A to 6C are schematic block diagrams of neighbouring pixels for calculating the coefficient of a linear model according to an embodiment of the present disclosure.

DETAILED DESCRIPTION

Figure 4A:
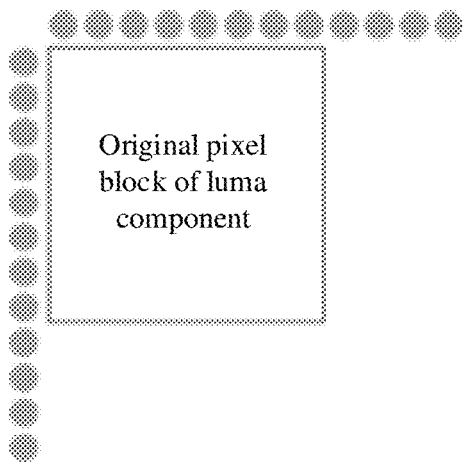
FIGS. 4A and 4B are schematic block diagrams of associated pixels of a CU according to an embodiment of the present disclosure.

To make the objectives, technical solutions and advantages of the present invention clearer, the disclosure is further described in detail with reference to the drawings and embodiments. It should be understood that the specific embodiments described here are merely used to explain the present invention, and are not used to limit the present invention.

It is understandable that, the terms "first", "second", and the like used in the present invention may be used herein to describe various elements, but these elements are not limited by these terms. These terms are only used to distinguish one element from another. For example, without departing from the scope of the present invention, a first client may be referred to as a second client; and similarly, the second client may be referred to as the first client. Both the first client and the second client are clients, but are not the same client.

Firstly, terms and related technologies used in the embodiments of the present disclosure are introduced.

For partition of pictures, in order to display video content more flexibly, a Coding Tree Unit (CTU), a Coding Unit (CU), a Prediction Unit (PU) and a Transform Unit (TU) are defined in a High Efficiency Video Coding (HEVC) standard technology. The CTU, the CU, the PU and the TU are all picture blocks.

For the CTU, a picture is composed of a plurality of CTUs. One CTU generally corresponds to one square picture region, including luma pixels and chroma pixels in the picture region (or may only include the luma pixels, or may only include the chroma pixels). The CTU further includes syntax elements. These syntax elements indicate the method of partitioning the CTU into at least one CU and decoding each CU to obtain a reconstructed picture. As shown in FIG. 1A, a picture 10 is composed of the plurality of CTUs (including CTU A, CTU B, CTU C and the like). Coding information corresponding to a certain CTU includes luma values and/or chroma values of the pixels in the square picture region corresponding to the CTU. In addition, the coding information corresponding to the certain CTU may further include the syntax elements. These syntax elements indicate how to partition the CTU into at least one CU and decode each CU to obtain the reconstructed picture. The picture region corresponding to the CTU may include 64×64, 128×128, or 256×256 pixels. In an example, the CTU of the 64×64 pixels includes a rectangular pixel lattice that has 64 columns with 64 pixels in each column Each pixel includes a luma component and/or a chroma component. CTU may also correspond to a rectangular picture region or a picture region of another shape. The picture region corresponds to one CTU may also be a picture region in which the number of pixels in a horizontal direction is different from the number of pixels in a vertical direction, for example, including 64×128 pixels.

The CU generally corresponds to a rectangular region A×B in a picture, including A×B luma pixels or/and chroma pixels corresponding to the luma pixels, where A is the width of the rectangle, and B is the height of the rectangle. A and B may be the same, or may be different. The values of A and B are generally an integer power of 2, for example, 128, 64, 32, 16, 8, or 4. The width mentioned in the embodiments of the present disclosure is the length in a two-dimensional rectangular coordinate system XoY shown in FIG. 1 in an X-axis direction (horizontal direction), and the height is the length in the two-dimensional rectangular coordinate system XoY shown in FIG. 1 in a Y-axis direction (vertical direction). The reconstructed picture of the CU may be obtained by adding a prediction picture and a residual picture. The prediction picture is generated by means of intra prediction or inter prediction, which may specifically be composed of one or more Prediction Blocks (PBs). The residual picture is generated by means of performing inverse quantization and inverse transformation on a transformation coefficient, which may specifically be composed of one or more Transform Blocks (TBs). Specifically, the CU includes coding information. The coding information includes information such as a prediction mode and the transformation coefficient. Decoding processing such as prediction, inverse quantization and inverse transformation is performed on the CU according to the coding information, so as to generate the reconstructed picture corresponding to the CU.

The PU is a basic unit of intra prediction and inter prediction. Motion information defining a picture block includes an inter prediction direction, a reference frame, a motion vector, and the like. The picture block undergoing coding processing is called as the current coding block (CCB); and the picture block undergoing decoding processing is called as a current decoding block (CDB). For example, when prediction processing is performed on a picture block, the CCB or the CDB is a PB; and when residual processing is performed on the picture block, the CCB or the CDB is a TB. A picture in which the CCB or the CDB is located is referred to as a current picture. In the current picture, the picture blocks located on the left side or upper side of the current block may be inside the current picture and have been coded/decoded, reconstruction pictures have been obtained, and they are referred to as reconstructed blocks. Information such as coding modes and reconstructed pixels of the reconstructed blocks may be available. Pictures that have been coded/decoded before the current frame is coded/decoded are referred to as reconstructed pictures. When the current picture is a one-way prediction picture (P picture) or a bidirectional prediction picture (B picture), the current picture has one or two reference picture lists. The two lists are respectively referred to as L0 and L1, and each list includes at least one reconstructed picture which is referred to as the reference picture of the current picture. The reference picture provides a reference pixel for the inter prediction of the current picture.

The TU processes the residual between an original picture block and a prediction picture block.

A pixel (also referred to as a pixel point) refers to a pixel in a picture, for example, the pixel in the CU, the pixel (also referred to as a luma pixel) in a luma component pixel block, the pixel (also referred to as a chroma pixel) in a chroma component pixel block, and the like.

A sample (also referred to as a pixel value) refers to a pixel value of a pixel. The pixel value in a luma component domain specifically refers to luma (that is, a gray-scale value). The pixel value in a chroma component domain specifically refers to a chroma value (that is, colour and saturation). According to different phases, the sample of the pixel specifically includes an original sample, a prediction sample and a reconstructed sample.

Intra prediction means a prediction picture of a current block is produced according to spatial neighbouring pixels of the current block. An intra prediction mode corresponds to a method for generating a prediction picture. The partition of an intra prediction unit includes a 2N×2N partition mode and a N×N partition mode. The 2N×2N partition mode does not perform partition on the picture block. The N×N partition mode is to partition the picture block into four equal-sized picture sub-block.

Generally, a method of applying a digital video compression technology to a video sequence with a colour coding mode of YCbCr, which may also be referred to as YUV, and a colour format of 4:2:0, 4:2:2 or 4:4:4. Y represents luma (luminance or luma), which is a gray-scale value; Cb represents a blue chroma component; Cr represents a red chroma component; and U and V represent chroma (Chrominance or chroma), which are used for describing the colour and the saturation. In terms of the colour format, 4:2:0 represents that every 4 pixels have 4 luma components and 2 chroma components (YYYYCbCr); 4:2:2 represents that every 4 pixels have 4 luma components and 4 chroma components (YYYYCbCrCbCr); and 4:4:4 represents full pixel display (YYYYCbCrCbCrCbCrCbCr). FIGS. 2A to 2C show a distribution diagram of components in different colour formats, where circles are Y components, and triangles are UV components.

During digital video coding, a coder reads pixels for an original video sequence with different colour formats and performs coding. A general digital coder generally includes prediction, transformation and quantization, inverse transformation and inverse quantization, loop filtering and entropy coding, which are configured to eliminate spatial, temporal, visual, and character redundancy. However, human eyes are more sensitive to changes in the luma component, and have less-strong response to changes in the chroma component. Therefore, the colour format of YUV 4:2:0 is generally used in the original video sequence for coding. In addition, the digital video coder uses different prediction processes for the luma component and the chroma component in an intra coding portion. The prediction for the luma component is more detailed and complex, and the prediction for the chroma component is relatively simple. A Cross Component Prediction (CCP) mode is a technology in current digital video coding that acts on the luma component and the chroma component to increase a video compression ratio.

A specific implementation process of the CCP mode acts in intra coding. The method includes using a training sample of a luma block to determine a linear model for predicting a chroma block, and using the sample of the luma block and the linear model to determine a sample of the chroma block. The luma block and the chroma block are pixel blocks of the CU in the luma component and the chroma component. The digital video coder usually reads the original video sequence into pictures and segments the pictures into CTUs. Then the CTUs may be continuously partitioned into CUs with different sizes or the same size. A specific coding process is performed in the CUs of different components. A relationship between the CTUs and the CUs is shown in FIG. 3.

Figure 4B:
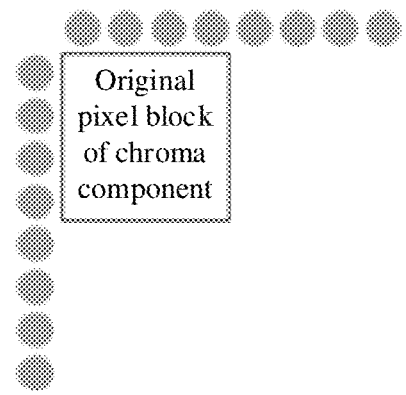

An example of CCP: in a Versatile Video Coding (VVC) standard, a Cross Component Linear Model (CCLM) is used to reduce the redundancy between the components. The linear model is obtained by training an original sample and reconstructed samples of the neighbouring pixels of an original pixel block of the luma component of the Current Coding Unit (CCU). Sample information of the neighbouring pixels includes an original sample and a reconstructed sample of an upper neighbouring pixel of the original pixel block of the luma component of the CCU, an original sample and a reconstructed sample of an upper right neighbouring pixel of the original pixel block of the luma component of the CCU, an original sample and a reconstructed sample of a left neighbouring pixel of the original pixel block of the luma component of the CCU, and an original sample and a reconstructed sample of a lower left neighbouring pixel of the original pixel block of the luma component of the CCU. FIGS. 4A and 4B respectively show examples of a position relationship between an 8×8 original pixel block of the luma component and the neighbouring pixels and a position relationship between an 4×4 original prediction pixel block of the chroma component and the neighbouring pixels under the colour format YUV4:2:0.

In the CCU, the prediction samples of the pixels in the chroma component PB are obtained by calculating the reconstructed samples of the pixels in the original pixel block of the luma component of the CCU by means of the linear model and then performing down-sampling. A calculation process of the linear model is shown as follows.

$$\mathrm{Pred}_C(i,j) = \alpha \cdot \mathrm{Rec}_L(i,j) + \beta \quad (1)$$

Where (i, j) is the coordinates of the pixel; i specifically refers to an abscissa of the chroma component of the CCU, in a range of [0, width−1] with a step length of 1; width is a width of the PB of the chroma component of the CCU, which may be 4, 8, 16 and 32; j specifically refers to an ordinate of the PB of the chroma component of the CCU, in a range of [0, height−1] with a step length of 1; height is a height of the PB of the chroma component of the CCU, which may be 4, 8, 16 and 32; $\mathrm{Rec}_L$ is a reconstructed sample of a pixel in the original pixel block of the luma component; $\mathrm{Pred}_c$ is a prediction sample of a pixel in the PB of the chroma component; and α are β are coefficients of the linear model.

The CCLM technology of the VVC includes LM, LM_L and LM_ALM, LM_L and LM_A modes. The LM_L only uses the left neighbouring samples to calculate the linear model; and the LM_A only uses the upper neighbouring samples to calculate the linear model.

In another CCP example, a China digital Audio Video coding Standard (AVS) newly adopts a cross-component technology proposal M4612, which is a Two Step CCP Mode (TSCPM). During coding, as shown in FIG. 5, calculations of the intra coding luma component are performed in up to 65 intra prediction modes. DC represents a mean value mode; Plane represents a plane mode; Bilinear represents a bilinear mode; and Zone represents a region. An optimal result is selected according to a rate distortion cost, and the intra prediction mode and corresponding prediction residual are transmitted. When cross-component technology prediction is performed on the pixels of the PB of the chroma component, the reconstructed samples of the neighbouring pixels of the original pixel block of the luma component of the CCU and the reconstructed samples of the neighbouring pixels of the original prediction pixel block of the chroma component of the CCU are used for calculating the linear model. The neighbouring pixels of the original pixel block of the luma component includes the upper neighbouring pixels and the left neighbouring pixels of the original pixel block of the luma component of the CCU; and the neighbouring pixels of the PB of the chroma component includes the upper neighbouring pixels and the left neighbouring pixels of the PB of the chroma component of the CCU.

When the reconstructed samples are selected as the reference samples for calculating the coefficient of the linear model, in combination with the availability of the reconstructed samples of the neighbouring pixels, a combination of the reconstructed samples of two pixels in the upper neighbouring pixels and the reconstructed samples of two pixels in the left neighbouring pixels may be used; or the reconstructed samples of four pixels in the upper neighbouring pixels may be entirely used, and the reconstructed samples of four pixels in the left neighbouring pixels may be entirely used.

According to different selections of the reference samples, the prediction mode is a TSCPM mode in the following three cases: the reconstructed samples of the upper neighbouring pixels of the original pixel block of the luma component and the original pixel block of the chroma component (collectively referred to as the original pixel block for ease of description) corresponding to the CCU and the reconstructed samples of the left neighbouring pixels of the original pixel block of the CCU are available, and the reference samples used for calculating the coefficient of the linear model are from both the upper and left neighbouring pixels; or only the reconstructed samples of the upper neighbouring pixels of the original pixel block corresponding to the CCU are available, and only the reconstructed samples of the upper neighbouring pixels are selected as the reference samples used for calculating the coefficient of the linear model; or only the reconstructed samples of the left neighbouring pixels of the original pixel block corresponding to the CCU are available, and only the reconstructed samples of the left neighbouring pixels are selected as the reference samples used for calculating the coefficient of the linear model. The prediction mode is a TSCPM_T if the reconstructed samples of the upper neighbouring pixels of the original pixel block corresponding to the CCU and the reconstructed samples of the left neighbouring pixels of the original pixel block corresponding to the CCU are available, and only the reconstructed samples of the upper neighbouring pixels are selected as the reference samples used for calculating the coefficient of the linear model. The prediction mode is a TSCPM_L mode if the reconstructed samples of the upper neighbouring pixels of the original pixel block corresponding to the CCU and the reconstructed samples of the left neighbouring pixels of the original pixel block corresponding to the CCU are available, and only the reconstructed samples of the left neighbouring pixels are selected as the reference samples used for calculating the coefficient of the linear model.

In the reference samples used for calculating the coefficient of the linear model, as shown in FIGS. 6A to 6C, if the reference samples are from the neighbouring pixels on two sides of the original pixel block corresponding to the CCU, the reconstructed sample of the leftmost pixel in the upper neighbouring pixels and the reconstructed sample of the upper rightmost pixel of the width of the original pixel block corresponding to the CCU are selected as the upper reference samples, and the reconstructed sample of the uppermost pixel in the left neighbouring pixels and the reconstructed sample of the lowest pixel in the left neighbouring pixels of the height of the original pixel block corresponding to the CCU are selected as the left reference samples. If the reference samples used for calculating the coefficient of the linear model are only from the upper side, the reconstructed samples of four consecutive step-length pixels are selected from the upper neighbouring pixels, where a one-quarter of the width of the original pixel block corresponding to the CCU is taken as the step length. If the reference samples are only from the left side, the reconstructed samples of four consecutive step-length pixels are selected from the left neighbouring pixels, where one-quarter of the height of the original pixel block corresponding to the CCU is taken as the step length.

That is to say, the neighbouring pixels of the four luma components and the neighbouring pixels of the four chroma components can be selected in three manners.

Manner I: when the two neighbouring pixels are selected from the upper neighbouring coding block and the left neighbouring coding block respectively, the neighbouring pixels may be determined and selected by means of the following formulas.

minStep=min(Width,Height);

TopIndex=(minStep−1)*Width/minStep;

LeftIndex=(minStep−1)*Height/minStep;

In the formulas, min(x, y) returns a smaller one of x and y; Width is a width of the chroma component of the CCB; Height is a height of the chroma component of the CCB; TopIndex is an index value of a neighbouring pixel other than the first neighbouring pixel when selecting the upper boundary neighbouring pixel; and LeftIndex is an index value of a neighbouring pixel other than the first neighbouring pixel when selecting the left boundary neighbouring pixel.

Manner II: when four neighbouring pixels are selected from only the upper neighbouring CB, four neighbouring pixels of the luma component and four neighbouring pixels of the chroma component starting from a starting neighbouring pixel on the leftmost side are selected, where one-quarter of the width of the chroma component of the CCB is a step length.

Manner III: when four neighbouring pixels are selected from only the left neighbouring CB, four neighbouring pixels of the luma component and four neighbouring pixels of the chroma component starting from a starting neighbouring pixel on the uppermost side are selected, where one-quarter of the height of the chroma component of the CCB is a step length.

In a specific example AVS3, a calculation formula of the linear model of the cross-component technology is the same as the above formula (1), and α and β may be obtained through calculation by means of the following formulas.

$$\alpha = \frac{Y_{Max} - Y_{Min}}{X_{Max} - X_{Min}} \quad (2)$$

$$\beta = Y_{Min} - \alpha \cdot X_{Min} \quad (3)$$

$Y_{Max}$ is an average of the two largest reconstructed samples in the reconstructed samples of the plurality of neighbouring pixels of the original pixel block of the chroma component used for calculating the coefficient of the linear model. $Y_{Min}$ is an average of two smallest reconstructed samples in the reconstructed samples of the plurality of neighbouring pixels of the original pixel block of the chroma component used for calculating the coefficient of the linear model. $X_{Max}$ is an average of two largest reconstructed samples in the reconstructed samples of the plurality of neighbouring pixels of the original pixel block of the luma component used for calculating the coefficient of the linear model. $X_{Min}$ is an average of the two smallest reconstructed samples in the reconstructed samples of the plurality of neighbouring pixels of the original pixel block of the luma component used for calculating the coefficient of the linear model.

CCP is performed according to the linear model obtained through calculation. The reconstructed block of the luma component of the CCU is configured to generate a corresponding chroma reference prediction pixel block. According to the formulas (1)/(2) and (3), a reference prediction sample of the chroma component of each pixel of the CCU is calculated. The size of the chroma reference prediction pixel block is the same as the size of the original pixel block of the luma component. In a specific example, the colour format of an input digital video is generally YUV4:2:0. That is to say, the size of the chroma component PB is one quarter of the original pixel block of the luma component. In order to obtain the corresponding chroma component PB with a correct size, down-sampling is required to be performed on the chroma reference prediction pixel block in the horizontal and vertical directions, respectively. The chroma reference prediction pixel block after down-sampling is one quarter of the original pixel block of the corresponding luma component, such that the size requirements of the colour format constraint can be met. The filter used for performing down-sampling on the chroma reference prediction pixel block is a down-sampling filter with two taps having the same coefficient used in a left boundary pixel region of the chroma reference prediction pixel block; and a down-sampling filter with six taps having pairwise different coefficients is used in other pixel regions.

The down-sampling filter with six taps having pairwise different coefficients is shown in a formula (4).

$$P_C^1(x, y) = \left( \begin{array}{c} 2 \times P'_C(2x, 2y) + 2 \times P'_C(2x, 2y+1) + P'_C(2x-1, 2y) + \\ P'_C(2x+1, 2y) + P'_C(2x-1, 2y+1) + P'_C(2x+1, 2y-1) + 4 \end{array} \right) \gg 3 \quad (4)$$

Where x and y are coordinates of the pixel; $P'_C$ is a prediction sample of the luma component of the current pixel; and $P^1_C$ and $P^2_C$ are prediction samples of the chroma component of the current pixel.

The down-sampling filter with two taps having the same coefficient is shown in a formula (5).

$$P_C^2(x,y) = (P'_C(2x,2y) + P'_C(2x,2y+1) + 1) \gg 1 \quad (5)$$

Where x and y are coordinates of the pixel; $P'_C$ is a prediction sample of the luma component of the current pixel; and $P^1_C$ and $P^2_C$ are prediction samples of the chroma component of the current pixel.

Figure 7:
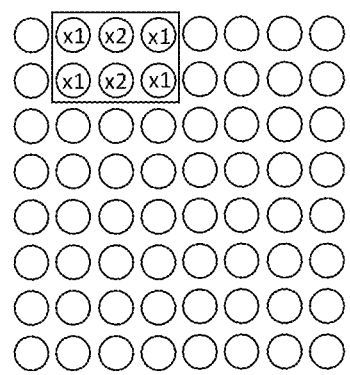
FIG. 7 is a schematic block diagram of a down-sampling filter according to an embodiment of the present disclosure.
Figure 8:
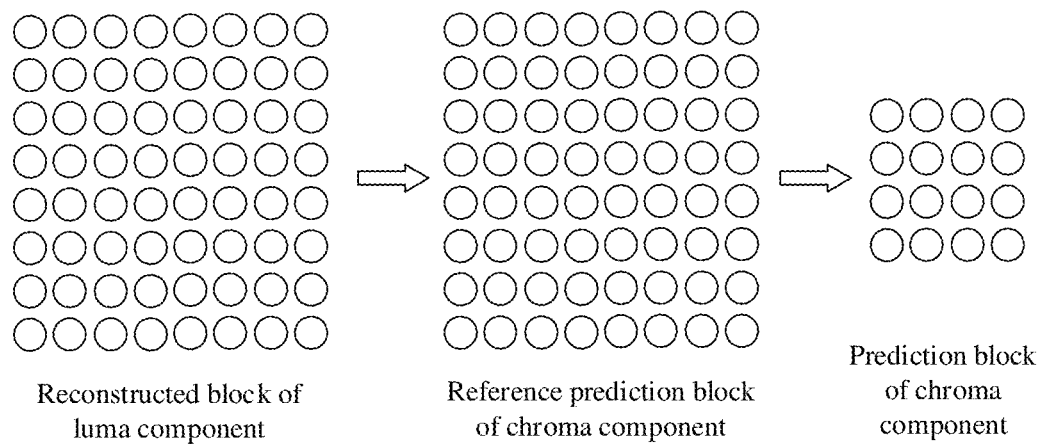
FIG. 8 is a schematic block diagram of a change from a luma component reconstructed block to a chroma component Prediction Block (PB) according to an embodiment of the present disclosure.

The down-sampling filter is shown in FIG. 7, where x1 means multiplying by 1, and x2 means multiplying by 2. FIG. 8 is a schematic diagram of a change from a luma component reconstructed block to a chroma component PB in the cross-component technology. The size of the luma component reconstructed block of the CU is 8*8, the size of the corresponding chroma reference prediction pixel block is 8*8, and the size of the filtered chroma reference prediction pixel block is 4*4.

AVS3 further adopts various CCP modes, of which two prediction modes are MPCM_T and MPCM_L.

The two prediction modes act on the chroma component. However, the prediction process of the U component is different from that of the V component; the prediction process of the U component is the same as that of the TSCPM_T and TSCPM_L; and the PB of the V component is obtained by subtracting the reconstructed block of the U component from a temporary chroma reference prediction pixel block. A specific formula is shown as follows.

$$\text{Pred}_{C'}(x,y) = \alpha' \cdot \text{Rec}_L(x,y) + \beta' \quad (6)$$

$$\text{Pred}_{Cr}(x,y) = \text{Pred}_{C'}(x,y) - \text{Rec}_{Cb}(x,y) \quad (7)$$

In the formulas (2) and (3), $\text{Pred}_C(x, y)$ is a prediction sample at the pixel (x, y) in the PB of the chroma component; $\text{Rec}_L(x, y)$ is a reconstructed sample at the pixel (x, y) in the reconstructed block of the luma component; $\text{Pred}_{C'}(x, y)$ is a prediction sample at the pixel (x, y) in the PB of the chroma component after down-sampling; $\text{Rec}_{cb}(x, y)$ is a reconstructed sample of the U component at the pixel (x, y) in the reconstructed block of the chroma component; $\text{Pred}_{Cr}(x, y)$ is a prediction sample of the V component at the pixel (x, y) in the PB of the chroma component; $\alpha'$ and $\beta'$ are the sums of linear parameters of the U component and the V component; and the linear parameters of the U component and the V component are calculated with reference to the formulas (2) and (3). Currently, when a conventional enhanced TSCP technology completely uses the reconstructed samples from the upper or left neighbouring coding units as reference information to calculate the linear model, so as to obtain the reference PB of the chroma component of the CCU, if the reconstructed samples are only from the upper neighbouring pixels, the reference information of the reconstructed samples from the left neighbouring pixels is missing; and if the reconstructed samples are only from the left neighbouring pixels, the reference information of the reconstructed samples from the upper neighbouring pixels is missing.

The above modes of simply selecting the reconstructed samples from the upper or left neighbouring pixels as the reference information to calculate the linear model may effectively enhance the spatial correlation from the single side, so that certain compression rates can be obtained in certain specific CUs. However, the manner of selecting the reconstructed samples of the neighbouring pixels at the single side as the reference information excessively relies on the sample values of the neighbouring pixels at the side. That is to say, if the mode of only selecting the reconstructed samples of the upper neighbouring pixels is selected as the reference information for the current chroma CU, the correlation of the samples of the inter-row pixels is missing; and if the mode of only selecting the reconstructed samples of the left neighbouring pixels is selected as the reference information for the current chroma CU, the correlation of the samples of the inter-column pixels is missing. By means of such prediction, a large amount of available reference information is wasted, and the sample values of the chroma component of the CCU cannot be well predicted, thereby losing the coding efficiency.

In view of the above technical problems, the following design concept is proposed in the present disclosure. Under the existing enhanced TSCPM, prediction refinement is performed, based on the correlation of the boundary neighbouring pixels in an orthogonal direction, on the PB of the chroma component after the down-sampling of the reference PB of the chroma component. After the current chroma CU selects the mode of only selecting the reconstructed samples of the upper neighbouring pixels as the reference information and obtains the sample values of the PB of the chroma component through calculation, prediction refinement is performed on each sample by selecting the reconstructed samples of the left neighbouring pixels. After the current chroma CU selects the mode of only selecting the reconstructed samples of the left neighbouring pixels as the reference information and obtains the sample values of the PB of the chroma component through calculation, prediction refinement is performed on the sample of each pixel by selecting the reconstructed samples of the upper neighbouring pixels.

Specifically, on a coding end, when coding the CU, it is first determined whether the CU may use the intra prediction filtering technology.

If intra prediction filtering may be used, intra prediction is performed on the luma component of the CU, and prediction sample refinement is performed on the samples of the PB of the luma component after the prediction is completed. Then, intra prediction is performed on the chroma component of the CU, and prediction sample refinement is performed on the samples of the PB of the chroma component after the prediction is completed. It is determined whether to use the intra prediction filtering technology (that is, performing prediction refinement based on the correlation of the boundary neighbouring pixels in the orthogonal direction) according to the rate distortion cost obtained by calculation on the samples of the unrefined PB and the samples of the refined PB.

The process of predicting the chroma component of the CU includes a coding process in other prediction modes and a coding process in the enhanced TSCPM.

If the intra prediction of the chroma component of the CCU is in other non-enhanced TSCPM, prediction refinement is not performed on the samples of the PB after prediction is completed.

If the intra prediction of the chroma component of the CCU is in the enhanced TSCPM, and if the current enhanced TSCPM is to only select the upper reconstructed samples as the reference information to calculate the linear model, the linear model performs calculation and performs down-sample to obtain the sample of the PB of the chroma component of the CCU, then after the prediction mode is completed, the reconstructed samples of the left neighbouring pixels are selected as the reference information, so as to perform prediction refinement on the prediction samples of all pixels of the chroma component of the CU by using an intra chroma component prediction filter.

If the current enhanced TSCPM is to only select the reconstructed samples of the left neighbouring pixels as the reference information to calculate the linear model, the linear model performs calculation and performs down-sample so as to obtain the samples of the PB of the chroma component of the CCU. Then after the prediction mode is completed, the reconstructed samples of the upper neighbouring pixels are selected as the reference information, so as to perform prediction refinement on the samples of all pixels of the chroma component of the CU by using an intra chroma component prediction filter.

The prediction refinement performed on the samples of the PB after the enhanced TSCPM includes: using a distance between the currently-processed pixel and a neighbouring pixel as an index value of the filtering coefficient; using a size of the CCU as an index value of a filtering coefficient group; searching for an intra chroma component prediction filtering coefficient group according to the index value of the filtering coefficient group, and finding an intra chroma component prediction filtering coefficient in the group according to the index value of the filtering coefficient; calculating a final prediction sample value according to the found filtering coefficient and a filtering formula; and according to the luma component and the chroma component of the CCU, determining whether to enable the prediction refinement technology, according to the rate distortion costs of the unrefined and refined PBs of the luma component and the chroma component of the CCU in an intra coding mode.

If the rate distortion cost of the unrefined PB of the CCU is less than the rate distortion cost of the refined PB of the CCU, the CCU does not use the prediction refinement technology based on the correlation of the boundary neighbouring pixels in the orthogonal direction, which may specifically include setting a flag bit used by the filtering technology to be false.

If the rate distortion cost of the unrefined PB of the CCU is greater than the rate distortion cost of the correct PB of the CCU, the CCU uses the prediction refinement technology based on the correlation of the boundary neighbouring pixels in the orthogonal direction, which may specifically include setting a flag bit used by the filtering technology to be true.

Specifically, at a decoding end, when the CCU selects intra prediction for coding, whether the CCU enables the enhanced TSCPM and whether the CCU enables intra prediction refinement technology are parsed. If the intra prediction of the chroma component of the CCU enables the enhanced TSCPM, and the current chroma prediction mode is the enhanced TSCPM and the CCU uses the intra prediction filter technology, the following are achieved.

If the CCU only selects the reconstructed samples of the upper neighbouring pixels as the reference information to calculate the linear model, and then the reference PB of the chroma component of the CCU is calculated by using the linear model and then the reference PB is downsampled to the PB of the chroma component, the reconstructed samples of the left neighbouring pixels are selected as the reference information, and prediction refinement is performed on the PB of the chroma component by using the intra chroma component prediction filter, so as to obtain a final sample of the PB.

If the CCU only selects the reconstructed samples of the left neighbouring pixels as the reference information to calculate the linear model, and then the reference PB of the chroma component of the CCU is calculated by using the linear model and then the reference PB is downsampled to the PB of the chroma component, the reconstructed samples of the upper neighbouring pixels are selected as the reference information, and prediction refinement is performed on the PB of the chroma component by using the intra chroma component prediction filter, so as to obtain a final prediction sample. It is determined whether to use the intra prediction refinement technology according to the prediction rate distortion costs of the luma component and the chroma component of the CCU.

If yes, when decoding a unit block, the parsed intra prediction refinement flag value and the index value of the intra prediction mode are acquired. If the intra prediction refinement flag value of the CDB is true, and the chroma component prediction mode of the CDB is the enhanced TSCPM, the prediction refinement technology based on the boundary neighbouring pixels in the orthogonal direction is used for decoding. First, the luma component of the CDB is predicted and the samples are reconstructed, it is determined according to the index value of the prediction mode of the chroma component of the CDB that only the reconstructed samples of the upper neighbouring pixels or the reconstructed samples of the left neighbouring pixels are selected as the reference information to calculate the linear model; and the reference PB of the chroma component of the CDB is calculated according to the linear model and is downsampled as the PB of the chroma component. Then, the coefficient of the intra chroma prediction filter is selected as the index value according to the size of the CDB and the distances between the current pixel and the neighbouring pixels; and weighted summation is performed on the prediction sample of the pixel currently processed and the reconstructed samples of the neighbouring pixels, so as to obtain the final prediction sample.

According to the embodiments of the present disclosure, the sample of each pixel is predicted by means of taking the correlation of the boundary neighbouring pixels in the orthogonal direction into consideration, thereby improving the prediction accuracy and the coding efficiency.

Embodiments of the present disclosure provide a picture coding method, a picture decoding method, and related apparatuses. Therefore, in a Cross Component Prediction (CCP) mode, a prediction sample of a chroma component of each pixel is refined by means of taking the correlation of boundary neighbouring pixels in an orthogonal direction into consideration, thereby improving the prediction accuracy and the coding efficiency.

According to a first aspect, an embodiment of the present disclosure provides a picture coding method. The picture coding method includes the operations of partitioning a picture, and determining a luma component intra prediction mode and a chroma component intra prediction mode of the Current Coding Block (CCB); when the chroma component intra prediction mode indicates using a luma component of the CCB to determine a prediction value of a chroma component of the CCB, determining a PB of the chroma component of the CCB according to the luma component intra prediction mode; and performing prediction refinement on the PB of the chroma component of the CCB, to obtain a refined PB of the chroma component of the CCB.

Compared with the conventional technology, in the solution of the present disclosure, in the CCP mode, the prediction sample of the chroma component of each pixel is predicted by means of taking the correlation of boundary neighbouring pixels in the orthogonal direction into consideration, thereby improving the prediction accuracy and the coding efficiency.

According to a second aspect, an embodiment of the present disclosure provides a picture decoding method. The picture decoding method includes the operations of parsing a bitstream, and determining a luma component intra prediction mode and a chroma component intra prediction mode of the Current Decoding Block (CDB); when the chroma component intra prediction mode indicates using a reconstructed block of a luma component of the CDB to determine a prediction value of a chroma component of the CDB, determining a PB of the chroma component of the CDB according to the luma component intra prediction mode; and performing prediction refinement on the PB of the chroma component of the CDB, to obtain a refined PB of the chroma component of the CDB.

Compared with the conventional technology, in the solution of the present disclosure, in the CCP mode, the prediction sample of the chroma component of each pixel is predicted by means of taking the correlation of the boundary neighbouring pixels in the orthogonal direction into consideration, thereby improving the prediction accuracy and the coding efficiency.

According to a third aspect, an embodiment of the present disclosure provides a picture coding apparatus. The picture coding apparatus includes: a partition unit, configured to partition a picture, and determine a luma component intra prediction mode and a chroma component intra prediction mode of the CCB; a determination unit, configured to, when the chroma component intra prediction mode indicates using a luma component of the CCB to determine a prediction value of a chroma component of the CCB, determine a reference PB of the chroma component of the CCB according to the luma component intra prediction mode; and a filtering unit, configured to filter the reference PB of the chroma component of the CCB, so as to obtain the PB of the chroma component of the CCB.

According to a fourth aspect, an embodiment of the present disclosure provides a picture decoding apparatus. The picture decoding apparatus includes: a parsing unit, configured to parse a bitstream, and determine a luma component intra prediction mode and a chroma component intra prediction mode of the CDB; a determination unit, configured to, when the chroma component intra prediction mode indicates using a reconstructed block of a luma component of the CDB to determine a prediction value of a chroma component of the CDB, determine a reference PB of the chroma component of the CDB according to the luma component intra prediction mode; and a filtering unit, configured to filter the reference PB of the chroma component of the CDB, so as to obtain the PB of the chroma component of the CDB.

According to a fifth aspect, an embodiment of the present disclosure provides a coder, including a processor and a memory coupled to the processor. The processor is configured to execute the method described in the first aspect.

According to a sixth aspect, an embodiment of the present disclosure provides a decoder, including a processor and a memory coupled to the processor. The processor is configured to execute the method described in the second aspect.

According to a seventh aspect, an embodiment of the present disclosure provides a terminal. The terminal includes one or more processors, a memory and a communication interface. The memory and the communication interface are connected to the one or more processors. The terminal communicates with other devices by means of the communication interface. The memory is configured to store a computer program code, and the computer program code includes instructions. When the one or more processors execute the instructions, the terminal executes the method described in the first aspect or the second aspect.

According to an eighth aspect, an embodiment of the present disclosure provides a computer-readable storage medium. The computer-readable storage medium stores instructions. When the instructions are running in a computer, the computer executes the method described in the first aspect or the second aspect.

According to a ninth aspect, an embodiment of the present disclosure provides a computer program product including instructions. When the instructions are running in a computer, the computer executes the method described in the first aspect or the second aspect.

The technical solutions in the embodiments of the present disclosure are clearly and completely described below with reference to the drawings in the embodiments of the present disclosure.

Figure 9:
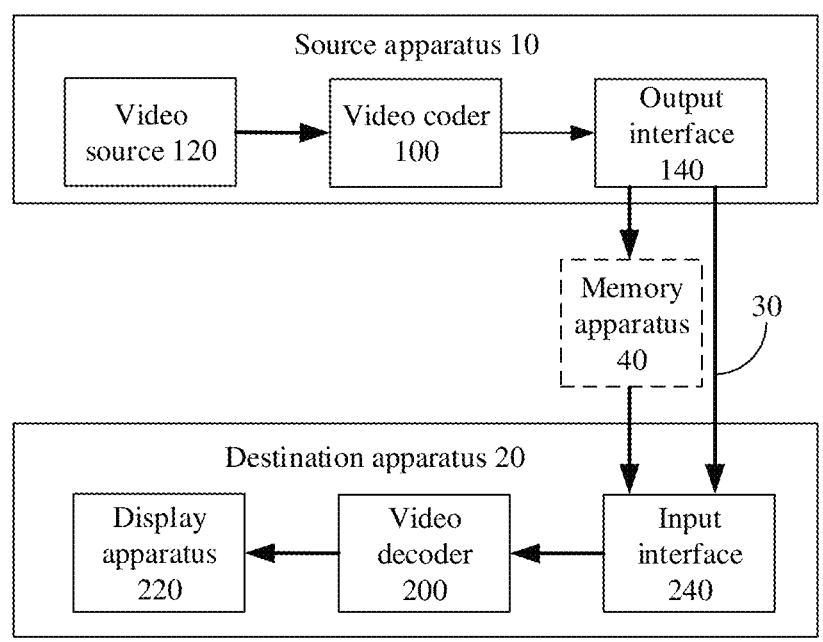
FIG. 9 is a schematic block diagram of a video decoding system according to an embodiment of the present disclosure.

FIG. 9 is a block diagram of a video decoding system 1 of an example described according to an embodiment of the present disclosure. As used herein, the term "video decoder" generally refers to both a video coder and a video decoder. In the present disclosure, the term "video decoding" or "decoding" can generally refer to video coding or video decoding. The video coder 100 and the video decoder 200 of the video decoding system 1 are configured to implement the CCP method proposed in the present disclosure.

As shown in FIG. 9, the video decoding system 1 includes a source apparatus 10 and a destination apparatus 20. The source apparatus 10 produces coded video data. Therefore, the source apparatus 10 may be referred to as a video coding apparatus. The destination apparatus 20 may decode the coded video data produced by the source apparatus 10. Therefore, the destination apparatus 20 may be referred to as a video decoding apparatus. Various implementations of the source apparatus 10, the destination apparatus 20 or both may include one or more processors and a memory coupled to the one or more processors. The memory may include, but is not limited to, RAM, ROM, EEPROM, flash memory, or any other media that can be used to store a desired program code in the form of instructions or data structures that can be stored by a computer, as described herein.

The source apparatus 10 and the destination apparatus 20 may include various apparatuses, including desktop computers, mobile computing apparatuses, notebook (for example, laptop) computers, tablet computers, set-top boxes, telephone hand-held sets such as so-called "smart" phones, televisions, cameras, display apparatuses, digital media players, video game consoles, vehicle computers, or the like.

The destination apparatus 20 may receive the coded video data from the source apparatus 10 via a link 30. The link 30 may include one or more media or apparatuses that can move the coded video data from the source apparatus 10 to the destination apparatus 20. In an example, the link 30 may include one or more communication media that make the source apparatus 10 directly transmit the coded video data to the destination apparatus 20 in real time. In this example, the source apparatus 10 may modulate the coded video data according to a communication standard (for example, a wireless communication protocol), and may transmit the modulated video data to the destination apparatus 20. The one or more communication media may include wireless and/or wired communication media, for example, Radio Frequency (RF) spectra or one or more physical transmission lines. The one or more communication media may form a part of a packet-based network. The packet-based network is, for example, a local area network, a wide area network, or a global network (for example, the Internet). The one or more communication media may include a router, a switch, a base station, or other device that causes the source apparatus 10 to communicate with the destination apparatus 20. In another example, the coded data may be outputted to a storage apparatus 40 from an output interface 140.

The picture coding and decoding technology of the present disclosure can be applied to video coding and decoding so as to support a plurality of multimedia applications, such as over-the-air television broadcasting, cable television transmission, satellite television transmission, streaming video transmission (for example, via the Internet), the coding for the video data stored on a data storage medium, the decoding for the video data stored on the data storage medium, or other applications. In some examples, the video decoding system 1 may be configured to support one-way or bidirectional video transmission so as to support applications such as video streaming, video playback, video broadcasting, and/or video telephones.

The video decoding system 1 shown in FIG. 9 is only an example. In addition, the technologies of the present disclosure may be applicable to video decoding setting (for example, video coding or video decoding) that do not necessarily include any data communication between the coding apparatus and the decoding apparatus. In other examples, data is retrieved from a local memory, and streamed over the network. The video coding apparatus may code the data and store the data in the memory; and/or the video decoding apparatus may retrieve the data from the memory and decode the data. In many examples, coding and decoding are performed by apparatuses that do not communicate with each other but only code the data into the memory and/or retrieve the data from the memory and decode the data.

In the example of FIG. 9, the source apparatus 10 includes a video source 120, a video coder 100, and an output interface 140. In some examples, the output interface 140 may include a modulator/a demodulator (modem) and/or a transmitter. The video source 120 may include a video capture apparatus (for example, a video camera), a video archive including previously-captured video data, a video feed interface for receiving the video data from a video content provider, and/or a computer graphics system for generating the video data, or a combination of these sources of the video data.

The video coder 100 may code the video data from the video source 120. In some examples, the source apparatus 10 transmits the coded video data directly to the destination apparatus 20 via the output interface 140. In other examples, the coded video data may also be stored in the storage apparatus 40 for later access by the destination apparatus 20 for decoding and/or playback.

In the example of FIG. 9, the destination apparatus 20 includes an input interface 240, a video decoder 200, and a display apparatus 220. In some examples, the input interface 240 includes a receiver and/or a modem. The input interface 240 may receive the coded video data via the link 30 and/or from the storage apparatus 40. The display apparatus 220 may be integrated into the destination apparatus 20 or may be disposed outside the destination apparatus 20. Generally, the display apparatus 220 displays the coded video data. The display apparatus 220 may include a plurality of display apparatuses, for example, liquid crystal displays (LCDs), plasma displays, Organic Light-Emitting Diode (OLED) displays, or other types of display apparatuses.

Although not shown in FIG. 9, in some aspects, the video coder 100 and the video decoder 200 may be integrated with audio coder and audio decoder respectively, and may include appropriate multiplexer-multiplexer units or other hardware and software, so as to perform coding of both audio and video in a common data stream or a separate data stream.

The video coder 100 and the video decoder 200 may respectively be implemented as any of the following plurality of circuits: one or more microprocessors, Digital Signal Processors (DSPs), Application-Specific Integrated Circuits (ASICs), Field-Programmable Gate Arrays (FPGAs), discrete logic, hardware, or any combination thereof. If the present disclosure is implemented in part in software, the apparatus may store the instructions for the software in a suitable non-volatile computer-readable storage medium, and one or more processors may be used to execute the instructions in hardware, thereby implementing the technology of the present disclosure. Any of the foregoing content (including hardware, software, and a combination of hardware and software) may be considered as the one or more processors. Each of the video coder 100 and the video decoder 200 may be included in one or more coders or decoders. Either of the coders or decoders may be integrated as part of a combined coder/decoder (codec) in the corresponding apparatus.

Figure 10:
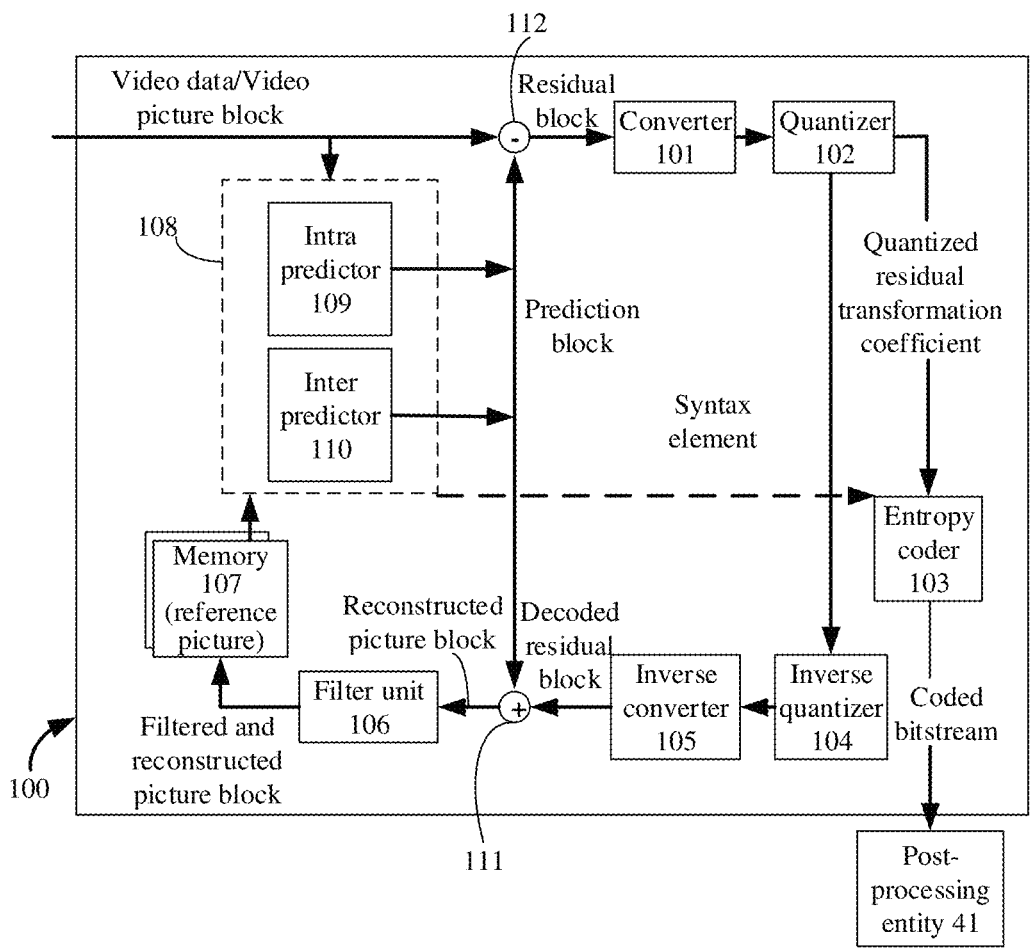
FIG. 10 is a schematic block diagram of a video coder according to an embodiment of the present disclosure.

FIG. 10 is a block diagram of an example of a video coder 100 according to an embodiment of the present disclosure. The video coder 100 is configured to output a video to a post-processing entity 41. The post-processing entity 41 represents an example of a video entity that may process the coded video data from the video coder 100, such as a Media-Aware Network Element (MANE) or a stitching/editing apparatus. In some cases, the post-processing entity 41 may be an example of a network entity. In some video coding systems, each of the post-processing entity 41 and the video coder 100 may be a separate apparatus. In other cases, the functionality described corresponding to the post-processing entity 41 may be executed by the same apparatus including the video coder 100. In a certain example, the post-processing entity 41 is an example of the storage apparatus 40 of FIG. 1.

In the example of FIG. 10, the video coder 100 includes a prediction processing unit 108, a filter unit 106, a memory 107, a summator 112, a converter 101, a quantizer 102, and an entropy coder 103. The prediction processing unit 108 includes an inter predictor 110 and an inter predictor 109. In order to reconstruct a picture block, the video coder 100 further includes an inverse quantizer 104, an inverse converter 105, and a summator 111. The filter unit 106 represents one or more loop filters, such as a deblocking filter, an Adaptive Loop Filter (ALF), and a Sample Adaptive Offset (SAO) filter. Although the filter unit 106 is shown as an in-loop filter in FIG. 10, in other implementations, the filter unit 106 may be implemented as a post-loop filter. In an example, the video coder 100 may further include a video data storage and a partition unit (not shown in the figure).

The video coder 100 receives the video data, and stores the video data in the video data storage. The partition unit partitions the video data into several picture blocks. These picture blocks may be further partitioned into smaller blocks, for example, picture block partitioning based on a quadtree structure or a binary tree structure. The prediction processing unit 108 may select one of a plurality of possible decoding modes for the current picture block, for example, one of a plurality of intra decoding modes or one of a plurality of inter decoding modes. The prediction processing unit 108 may provide the blocks subjected to the intra decoding and inter decoding to the summator 112 so as to generate residual blocks, and provide the residual blocks to the summator 111 to reconstruct the coded blocks used as reference pictures. The inter predictor 109 in the prediction processing unit 108 may perform intra prediction coding of the current picture block relative to one or more neighbouring blocks in the same picture or strip with the current block to be coded, so as to remove spatial redundancy. The inter predictor 110 in the prediction processing unit 108 may perform inter prediction coding of the current picture block relative to one or more PBs in one or more reference pictures, so as to remove time redundancy. The prediction processing unit 108 provides information indicating the selected intra or inter prediction mode for the current picture block to the entropy coder 103, such that the entropy coder 103 codes the information indicating the selected inter prediction mode.

After the prediction processing unit 108 produces the PB of the current picture block via inter prediction/intra prediction, the video coder 100 forms a residual picture block by subtracting the PB from the current picture block to be coded. The summator 112 represents one or more components that perform the subtraction operation. The residual video data in the residual block may be included in one or more TUs and applied to the converter 101. The converter 101 converts the residual video data into residual transformation coefficients by using transformation such as a Discrete Cosine Transformation (DCT) or a conceptually similar transformation. The converter 101 may convert the residual video data from a pixel value domain to a transformation domain, for example, a frequency domain.

The converter 101 may send the transformation coefficients to the quantizer 102. The quantizer 102 quantizes the transformation coefficients to further reduce the bit code rate. In some examples, the quantizer 102 may then execute the scanning of a matrix including the quantized transformation coefficients. Alternatively, the entropy coder 103 may execute the scanning.

After quantization, the entropy coder 103 performs entropy coding on the quantized transformation coefficients. For example, the entropy coder 103 may execute Context-Adaptive Variable Length Coding (CAVLC), Context-Adaptive Binary Arithmetic Coding (CABAC), Syntax-based context-adaptive Binary Arithmetic Coding (SBAC), Probabilistic Interval Partitioning Entropy (PIPE) coding, or another entropy coding method or technology. After the entropy coder 103 performs entropy coding, the entropy coder 103 may transmit a coded bitstream to the video decoder 200, or archive the same for later transmission or retrieve by the video decoder 200. The entropy coder 103 may further perform entropy coding on a syntax element of the current picture block to be coded.

The inverse quantizer 104 and the inverse converter 105 apply inverse quantization and inverse conversion, respectively, to reconstruct the residual block in a pixel domain, for example, for later use as a reference block of a reference picture. The summator 111 adds the reconstructed residual block to the PB produced by the inter predictor 110 or the inter predictor 109, so as to produce the reconstructed picture block. The filter unit 106 may be applied to the reconstructed picture block to reduce distortion, such as block artifacts. Then, the reconstructed picture block is stored in the memory 107 as the reference block that may be used by inter predictor 110 as the reference block, so as to perform inter prediction on blocks in subsequent video frames or pictures.

Specifically, the video coder 100 specifically performs the picture coding method provided in the embodiments of the present disclosure. An input video is partitioned into a plurality of CTUs, and each CTU is further partitioned into a plurality or rectangular or square CUs. When the CCU selects the intra prediction mode for coding, whether the CCU enables the enhanced TSCPM is parsed. Calculations of the luma component of the CCU in a plurality of prediction modes are traversed, and an optimal prediction mode is selected according to the rate distortion cost. Calculations of the chroma component of the CCU in a plurality of prediction modes are traversed, and the optimal prediction mode is selected according to the rate distortion cost.

The process of performing intra prediction on the chroma component includes the following operations.

If an enhanced TSCPM is enabled for a current video coding sequence, the prediction and prediction refinement method provided in the embodiments of the present disclosure is applied. First, reconstructed samples of the upper or left neighbouring pixels of the luma component of the CCU and reconstructed samples of the upper or left neighbouring pixels of the chroma component of the CCU are extracted, and a linear model applied to the CCU is calculated. Then, the reference PB of the chroma component of the CCU is calculated according to the linear model; down-sampling is performed on the reference PB; and prediction refinement based on correlation of boundary neighbouring pixels in the orthogonal direction is performed on the down-sampled PB, so as to obtain the final PB of the chroma component of the CCU. If the rate distortion cost is optimal, the technology of the present disclosure is selected as a final prediction mode, and a mode index is transmitted to the decoding end as a coding parameter of the current prediction mode of the CCU via a bitstream.

If the enhanced TSCPM is not enabled for a current video coding sequence, the intra prediction process does not use the prediction-refinement-based intra prediction technology according to the present disclosure. In this case, the prediction of the chroma component should be performed in a directional mode or a mean value mode to obtain the final PB of the chroma component.

Then, a residual between an original video block and the PB is calculated. The residual is subsequently subjected to transformation, quantization, and entropy coding in one path to form an output bitstream, and is subsequently subjected to inverse transformation, inverse quantization, and loop filtering in the other path to form reconstructed samples which are used as reference information for subsequent video compression.

The inter predictor 109 may further provide information indicating the selected intra prediction mode for the CCU to the entropy coder 103, such that the entropy coder 103 codes the information indicating the selected intra prediction mode.

Figure 11:
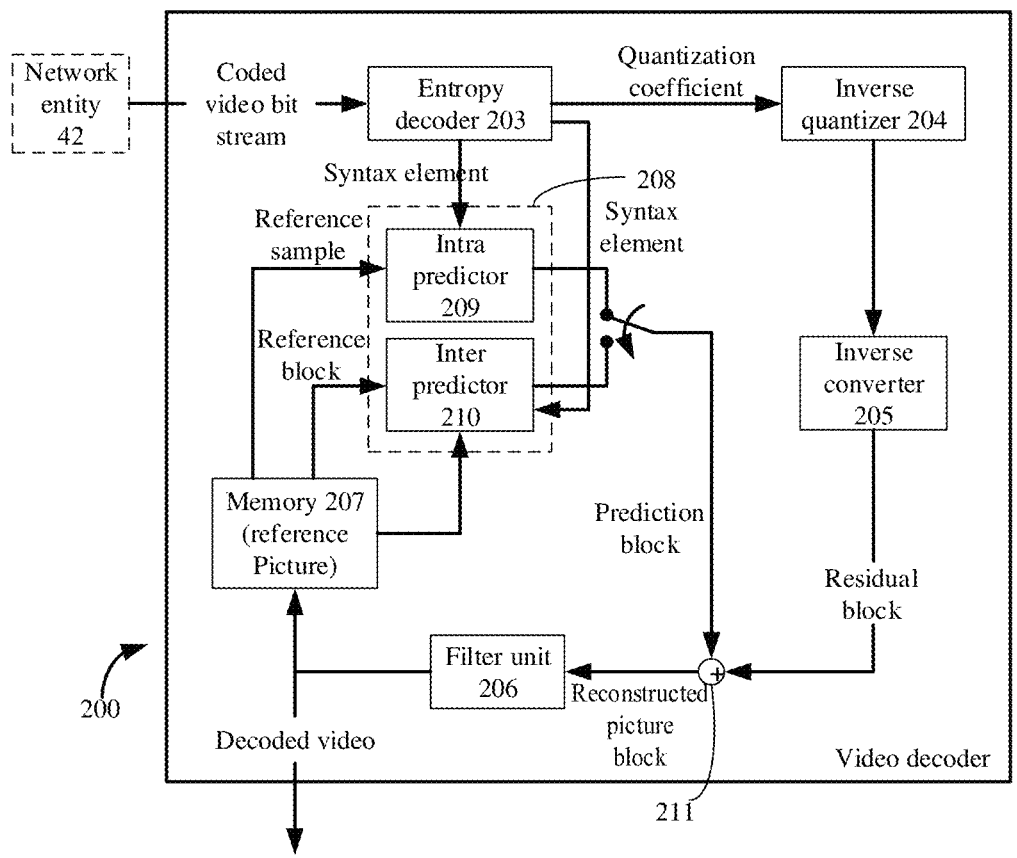
FIG. 11 is a schematic block diagram of a video decoder according to an embodiment of the present disclosure.

FIG. 11 is a block diagram of an example of a video decoder 200 according to an embodiment of the present disclosure. In an example of FIG. 11, the video decoder 200 includes an entropy decoder 203, a prediction processing unit 208, an inverse quantizer 204, an inverse converter 205, a summator 211, a filter unit 206, and a memory 207. The prediction processing unit 208 may include an inter predictor 210 and an inter predictor 209. In some examples, the video decoder 200 may execute a decoding process that is substantially interchangeable with the coding process described with respect to the video coder 100 from FIG. 10.

During the decoding process, the video decoder 200 receives, from the video coder 100, the picture block representing a coded video strips and a coded video bitstream of an associated syntax element. The video decoder 200 may receive video data from a network entity 42. Optionally, the video data may also be stored in the video data storage (not shown in the figure). The video data storage (not shown in the Figure) may store the video data to be decoded by the component of the video decoder 200, for example, the coded video bitstream. The video data stored in video data storage may be obtained, for example, from a storage apparatus 40, or from a local video source such as a camera, or via wired or wireless network communication of the video data, or by accessing physical data storage media. The video data storage may be used as a Coded Picture Buffer (CPB) used for storing the coded video data from the coded video bitstream.

The network entity 42 may be, for example, a server, a MANE, a video editor/chipper, or other such apparatus used for implementing one or more of the technologies described above. The network entity 42 may or may not include the video coder, for example, the video coder 100. Before the network entity 42 sends the coded video bitstream to the video decoder 200, the network entity 42 may implement portions of the technology described in the present disclosure. In some video decoding systems, the network entity 42 and the video decoder 200 may be separate apparatuses. In other cases, the functionality described corresponding to the network entity 42 may be executed by the same apparatus including the video decoder 200.

The entropy decoder 203 of the video decoder 200 performs entropy decoding on the bitstream, so as to produce the quantized coefficients and some syntax elements. The entropy decoder 203 forwards the syntax elements to the prediction processing unit 208. The video decoder 200 may receive the syntax elements at a video strip layer and/or a picture block layer. When the video strip is decoded as an intra decoded (I) strip, an inter predictor 209 of the prediction processing unit 208 produces the PB of the picture block of the current video strip on the basis of the signaled intra prediction mode and data from a previously-decoded block of the current picture. When the video strip is decoded as an inter decoded (that is, B or P) strip, an inter predictor 210 of the prediction processing unit 208 may determine an inter prediction mode for decoding the current picture block of the current video strip on the basis of the syntax elements received from the entropy decoder 203, and decode (for example, perform inter prediction on) the current picture block on the basis of the determined inter prediction mode.

The inverse quantizer 204 performs inverse quantization, that is, de-quantization, on the quantized transformation coefficients provided in the bitstream and decoded by the entropy decoder 203. The inverse quantization process may include: determining a degree of quantization to be applied by using quantization parameters calculated by the video coder 100 for each picture block in the video strip; and similarly determining a degree of inverse quantization to be applied. The inverse converter 205 applies inverse transformation, such as an inverse DCT, an inverse integer transformation, or a conceptually similar inverse transformation process, to the transformation coefficients, so as to produce a residual block in the pixel domain.

After the inter predictor 210 produces the PB for the current picture block or a sub-block of the current picture block, the video decoder 200 obtains a reconstructed block, that is, a decoded picture block, by summing the residual block from the inverse converter 205 with the corresponding PB produced by the inter predictor 210. The summator 211 represents a component that performs the summation operation. When required, the loop filter (in a decoding loop or after the decoding loop) may further be used to smooth the pixel transformation or improve the video quality in other manners. The filter unit 206 may represent one or more loop filters, such as a deblocking filter, an ALF, and an SAO filter. Although the filter unit 206 is shown as an in-loop filter in FIG. 11, in other implementations, the filter unit 206 may be implemented as a post-loop filter.

The picture decoding method specifically executed by the video decoder 200 includes performing parsing, inverse transformation and inverse quantization on the input bitstream, so as to obtain a prediction mode index of the CCU.

If the prediction mode index of the chroma component of the CCU is the enhanced TSCPM, only the reconstructed samples of the upper or left neighbouring pixels of the CCU are selected according to the index value, so as to calculate the linear model. The reference PB of the chroma component of the CCU is calculated according to the linear model; and down-sampling of the reference PB is performed, and prediction refinement based on the correlation of the boundary neighbouring pixels in the orthogonal direction is performed on the down-sampled PB, so as to obtain the final PB of the final chroma component.

One path of the subsequent bitstream is used as the reference information for subsequent video decoding, and the other path of the subsequent bitstream is subjected to post-filtering processing to outputs video signals.

It is to be understood that, other structural variations of the video decoder 200 can be used to decode the coded video bitstream. For example, the video decoder 200 may produce an output video stream without processing by the filter unit 206. Alternatively, for certain picture blocks or pictures, the entropy decoder 203 of the video decoder 200 does not decode the quantized coefficients, and accordingly they do not need processing by the inverse quantizer 204 and inverse converter 205.

Specifically, the inter predictor 209 can use the picture decoding method described in the embodiments of the present disclosure during the production of the PB.

Figure 12A:
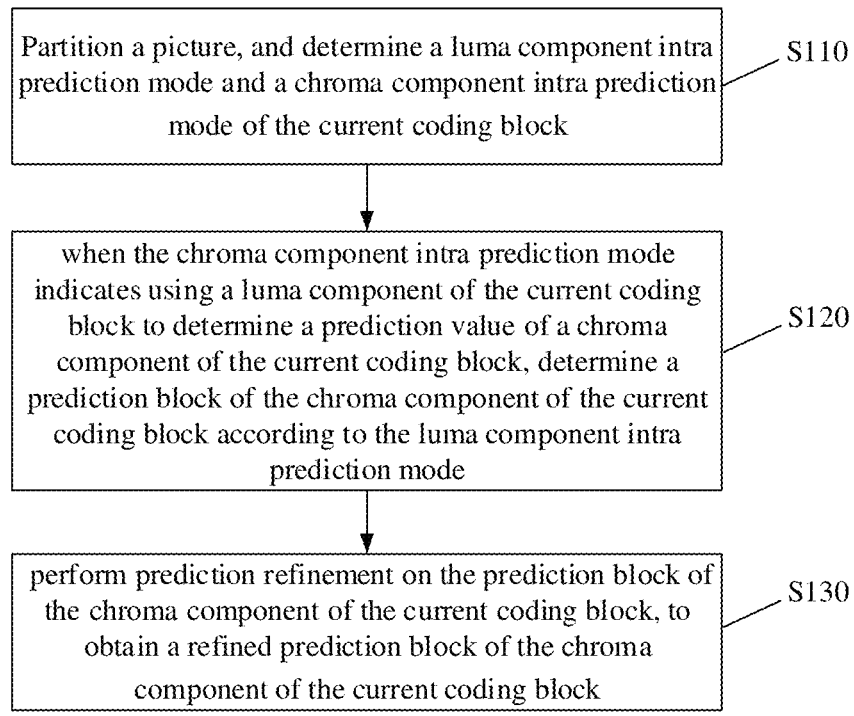
FIG. 12A is a flowchart of a picture coding method according to an embodiment of the present disclosure.

FIG. 12A is a flowchart of a picture coding method according to an embodiment of the present disclosure. The picture coding method may be applied to the source apparatus 10 in the video decoding system 1 shown in FIG. 9 or the video coder 100 shown in FIG. 10. The process shown in FIG. 12A is described by using an execution subject being the video coder 100 shown in FIG. 10 as an example. As shown in FIG. 12A, the CCP method provided in the embodiments of the present disclosure includes the following steps.

At S110, a picture is partitioned, and a luma component intra prediction mode and a chroma component intra prediction mode of the CCB are determined.

The colour format of the video to which the picture belongs includes, but is not limited to, 4:2:0, 4:2:2, and the like.

For example, when the colour format is 4:2:0, as shown in FIG. 2C, a pixel ratio of the original pixel block of the luma component of the CCB to the original pixel block of the chroma component is 4:1. Taking a positive square pixel array of 8*8 as an example, the size of the original pixel block of the corresponding luma component is 8*8, and the size of the original pixel block of the corresponding chroma component is 4*4.

For another example, when the colour format is 4:2:2, as shown in FIG. 2B, a pixel ratio of the original pixel block of the luma component of the CCB to the original pixel block of the chroma component is 2:1. Using a positive square pixel array of 8*8 as an example, the size of the original pixel block of the corresponding luma component is 8*8, and the size of the original pixel block of the corresponding chroma component is 8*4.

As shown in FIG. 5, calculations of the intra coding luma component may be performed in up to 65 intra prediction modes. In an implementation, calculations of the luma component are performed in up to 62 angular prediction modes and 3 non-angular prediction modes and an optimal intra prediction mode is selected for transmission, while calculations of the chroma component are performed in up to 6 prediction modes. The intra prediction mode for the luma component of the CCB is a prediction mode with an optimal rate distortion cost among the plurality of intra prediction modes. The plurality of intra prediction modes are the intra prediction modes used for the intra prediction of the luma component of the CCB.

At S120, when the chroma component intra prediction mode indicates using a luma component of the CCB to determine a prediction value of a chroma component of the CCB, a PB of the chroma component of the CCB is determined according to the luma component intra prediction mode.

In this possible example, the step of determining the PB of the chroma component of the CCB according to the luma component intra prediction mode includes: determining a reference PB of the chroma component of the CCB according to the luma component intra prediction mode; and filtering the reference PB of the chroma component of the CCB, so as to obtain the PB of the chroma component of the CCB.

During implementation, the device may, insofar as determining that the luma component intra prediction mode is a preset intra prediction mode, determine that the chroma component intra prediction mode indicates using the luma component of the CCB to determine the prediction value of the chroma component of the CCB. The preset intra prediction mode is the luma component intra prediction mode in a preset direction. The preset direction includes, but is not limited to, a horizontal direction (for example, in an X-axis direction in a two-dimensional rectangular coordinate system XoY depicted in FIG. 1), and a vertical direction (for example, in a negative direction along a Y-axis in the two-dimensional rectangular coordinate system XoY described in FIG. 1).

In this possible example, the operation of filtering the reference PB of the chroma component of the CCB includes: filtering the reference PB of the chroma component of the CCB by using a third filter.

In this possible example, the third filter includes a filter that is configured to filter a left boundary pixel region of the reference PB of the chroma component and a filter that is configured to filter a non-left boundary pixel region of the reference PB of the chroma component.

In this possible example, the filter that is configured to filter the left boundary pixel region of the reference PB of the chroma component comprises a third two-tap filter. The third two-tap filter satisfies the following:

$$P_C(x,y)=(P'_C(2x,2y)+P'_C(2x,2y+1)+1)>>1.$$

Where x and y are coordinates of a pixel; $P'_C$ is a prediction sample of the pixel in the reference PB of the chroma component; and $P_C$ is a prediction sample of the chroma component of the current pixel in the PB of the chroma component.

In this possible example, the filter that is configured to filter the non-left boundary pixel region of the reference PB of the chroma component comprises a first six-tap filter. The first six-tap filter satisfies the following:

$$P_C(x, y) = \left(\begin{array}{c} 2\times P'_C(2x, 2y) + 2\times P'_C(2x, 2y+1) + P'_C(2x-1, 2y) + \\ P'_C(2x+1, 2y) + P'_C(2x-1, 2y+1) + P'_C(2x+1, 2y-1) + 4 \end{array}\right) \gg 3.$$

Where x and y are coordinates of the current pixel; $P'_C$ is the prediction sample of the pixel in the reference PB of the chroma component; and $P_C$ is the prediction sample of the chroma component of the current pixel in the PB of the chroma component.

In this possible example, the operation of determining the reference PB of the chroma component of the CCB according to the luma component intra prediction mode includes actions of determining a reconstructed block of the luma component of the CCB according to the luma component intra prediction mode, and determining the reference PB of the chroma component of the CCB according to the reconstructed block of the luma component of the CCB.

The size of the reference PB of the chroma component is the same as the size of the reconstructed block of the luma component. For example, the reconstructed block of the luma component and the reference PB of the chroma component during the prediction process shown in FIG. 8 are both 8*8 pixel arrays.

In this possible example, the operation of determining the reference PB of the chroma component of the CCB according to the reconstructed block of the luma component of the CCB includes actions of determining a linear model that uses the reconstructed block of the luma component of the CCB to perform CCP; and calculating the reconstructed block of the luma component according to the linear model, to obtain the reference PB of the chroma component of the CCB.

The linear mode may be, for example, the linear model shown in the foregoing formula (1) or (2) or (3).

In this possible example, the operation of determining the linear model that uses the reconstructed block of the luma component of the CCB to perform CCP includes actions of determining a reference pixel used for calculating the linear model, where the reference pixel includes at least one neighbouring pixel of the CCB; and calculating the linear model according to the reference pixel.

The selection of reference pixels used to calculate the linear model can be extended to the neighbouring pixels on the lower left side, left side, upper left side, upper side, and upper right side of the CCB.

Optionally, if the CCB is a partial picture block in the CCB, the device may select the linear model adapted to the CCB from a plurality of linear models, specifically, the device may select the adaptive linear model for the CCB according to picture characteristics. Since the coefficient of the linear model is not determined yet, it also needs to be calculated according to the reference pixels. It can be seen that, the device predicts the chroma component of the CCB, and can provide a more refined prediction mechanism relative to the coding block, so as to achieve more refined picture prediction.

In this possible example, the operation of determining the reference pixel used for calculating the linear model includes actions of determining the reference pixel for calculating the linear model according to available information of the reconstructed sample of the neighbouring pixel of the CCB and the chroma component intra prediction mode.

The intra prediction mode of the chroma component of the CCB includes any one of TSCPM_T, TSCPM_L, MPCM_T, or MPCM_L. The available information specifically includes both sides available and single side available (for example, left side available and right side available). Details are described below.

If the intra prediction mode of the chroma component of the CCB is TSCPM_T or MPCM_T, and the reconstructed samples of the upper neighbouring pixels of the original pixel block corresponding to the CCB and the reconstructed samples of the left neighbouring pixels of the original pixel block corresponding to the CCB are available, the reference neighbouring pixels used to calculate the coefficients of the linear model are 4 of the upper neighbouring pixels of the original pixel block, as shown in FIG. 6B.

If the intra prediction mode of the chroma component of the CCB is TSCPM_L or MPCM_L, and the reconstructed samples of the upper neighbouring pixels of the original pixel block corresponding to the CCB and the reconstructed samples of the left neighbouring pixels of the original pixel block corresponding to the CCB are available, the reference neighbouring pixels used to calculate the coefficients of the linear model are 4 of the left neighbouring pixels of the original pixel block, as shown in FIG. 6C.

It can be seen that, in this example, the reference neighbouring pixels used to calculate the coefficients of the linear model can be set flexibly according to the availability of the reconstructed samples of neighbouring pixels and the intra prediction mode of the chroma component.

In this possible example, the operation of determining the reference pixel used for calculating the linear model includes an action of determining the reference pixel for calculating the linear model according to a luma component intra prediction mode with an optimal rate distortion cost of the neighbouring coding block of the CCB.

The intra prediction mode with an optimal rate distortion cost of the luma component of the neighbouring coding block may be the same as or different from the intra prediction mode with an optimal rate distortion cost of the luma component of the CCB.

At S130, prediction refinement is performed on the PB of the chroma component of the CCB, to obtain a refined PB of the chroma component of the CCB.

In this possible example, the operation of performing prediction refinement on the PB of the chroma component of the CCB includes actions of determining a filter according to the chroma component intra prediction mode; and performing prediction refinement on the PB of the chroma component of the CCB by using the filter.

A filtering direction of the filter is orthogonal to the direction of the neighbouring pixels used to calculate the linear model relative to the CCB in the chroma component intra prediction mode (specifically including a vertical direction and a horizontal direction, the vertical direction corresponding to the use of the upper neighbouring pixels to calculate the linear model and the horizontal direction corresponding to the use of the left neighbouring pixels to calculate the linear model), so that the prediction sample of the chroma component of each pixel is can be predicted by means of taking the correlation of the neighbouring pixels in the orthogonal direction into consideration.

In this possible example, the operation of determining the filter according to the chroma component intra prediction mode includes an action of setting the filter as a first filter when the chroma component intra prediction mode is a TSCPM_T or an MPCM_T.

In this possible example, the first filter is configured to filter a pixel region neighbouring a left boundary of the PB of the chroma component of the CCB and a pixel region of the PB of the chroma component of the CCB.

Figure 12B:
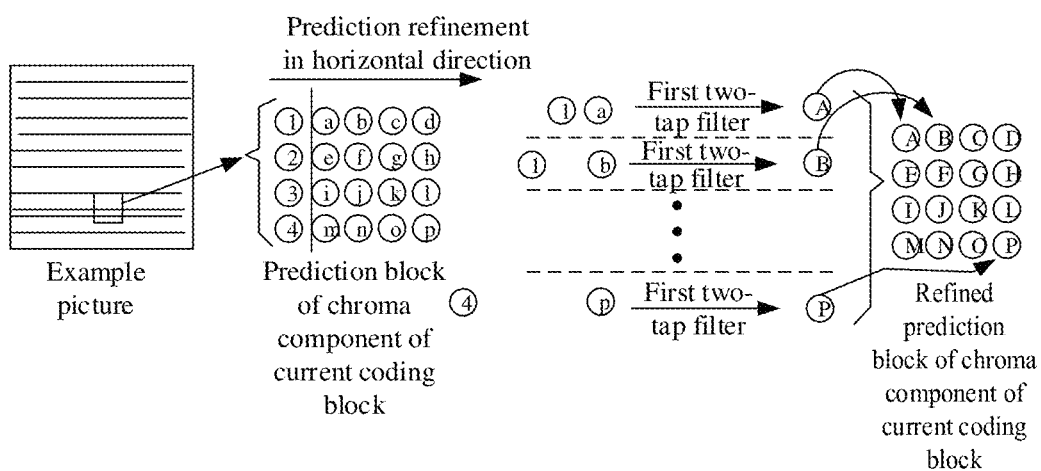
FIG. 12B is a schematic diagram of a down-sampling process in a horizontal direction according to an embodiment of the present disclosure.

For example, during a down-sampling process in the horizontal direction in a 4*4 pixel array as shown in FIG. 12B, taking the pixels in the PB of the chroma component and the left boundary neighbouring pixels as an example, first, a pixel A of the refined PB of the chroma component is formed by performing down-sampling on the pixel a and the left boundary neighbouring pixel 1 by using the first two-tap filter; in the horizontal direction, a pixel B of the refined PB of the chroma component is formed by performing down-sampling on the pixel b and the left boundary neighbouring pixel 1 by using the first two-tap filter; and so on, until a pixel P of the refined PB of the chroma component is formed by performing down-sampling on the pixel p and the left boundary neighbouring pixel 4 by using the first two-tap filter.

In this possible example, the first filter includes a first two-tap filter. The first two-tap filter satisfies the following:

$$P'(x,y)=f(x)\cdot P(-1,y)+(1-f(x))\cdot P(x,y).$$

Where x and y are coordinates of a current pixel; the value of x does not exceed a value range of the width of the CCB, and the value of y does not exceed a value range of the height of the CCB; P'(x, y) is a final prediction sample of the pixel (x, y) of the PB of the chroma component of the CCB; P(−1, y) is a reconstructed sample of a pixel located at row y and neighbouring the left boundary; f(x) is a horizontal filtering coefficient of the reference pixel P(−1, y) of the pixel (x, y); and P(x, y) is an original prediction sample of the pixel (x, y).

In this possible example, the horizontal filtering coefficient is determined by means of a first parameter set; and the first parameter set comprises a size of the PB of the chroma component and a distance between the pixel (x, y) and the pixel P(−1, y).

The value of the above horizontal filtering coefficient is related to a size of the chroma component of the CCB and distances between the predicted pixel in the PB of the current chroma component and the left neighbouring pixels.

Specifically, selection of the filtering coefficient is related to a size of the chroma component. The filtering coefficients are divided into different filter coefficient groups according to the size of the PB of the chroma component of the CCB. The corresponding filter coefficient group is selected according to the size of the PB of the current chroma component. The selection of the above horizontal filtering coefficient is related to the distances between the prediction pixel and the left neighbouring pixels. The distances between the currently-predicted pixel and the left neighbouring pixels are used as index values, so as to select the corresponding filtering coefficient from the corresponding filter coefficient group. The intra chroma prediction filtering coefficients are shown in Table 1. It is to be noted that, all coefficients in the table can be scaled up and shifted during the specific coding process, so as to reduce the computation complexity.

TABLE 1

Intra chroma prediction filtering coefficient

| | | Size of CB | | | | |
|---|---|---|---|---|---|---|
| | | 4 | 8 | 16 | 32 | 64 |
| Distances between prediction sample and reconstructed samples | 1 | 3/8 | 11/16 | 5/8 | 9/16 | 13/16 |
| | 2 | 1/14 | 25/64 | 27/64 | 27/64 | 11/16 |
| | 3 | 1/32 | 7/32 | 19/64 | 21/64 | 37/16 |
| | 4 | 0 | 1/8 | 13/64 | 1/4 | 31/16 |
| | 5 | 0 | 1/16 | 9/64 | 3/16 | 13/32 |
| | 6 | 0 | 1/32 | 1/14 | 9/64 | 11/32 |
| | 7 | 0 | 1/64 | 1/16 | 5/64 | 15/64 |
| | 8 | 0 | 1/64 | 3/64 | 5/64 | 15/64 |
| | 9 | 0 | 0 | 1/32 | 1/16 | 13/64 |
| | 10 | 0 | 0 | 1/64 | 3/64 | 11/64 |

In addition, the filter coefficients of the technology can reduce coefficient storage by means of coefficient truncation. That is to say, all currently-predicted pixels that have distances of greater than 10 from the left neighbouring pixels have a same filter coefficient.

In this possible example, the operation of determining the filter according to the chroma component intra prediction mode includes that, when the chroma component intra prediction mode is a TSCPM_L or MPCM_L, the filter is set as a second filter.

In this possible example, the second filter is configured to filter a pixel region neighbouring an upper boundary of the PB of the chroma component of the CCB and a pixel region of the PB of the chroma component of the CCB.

Figure 12C:
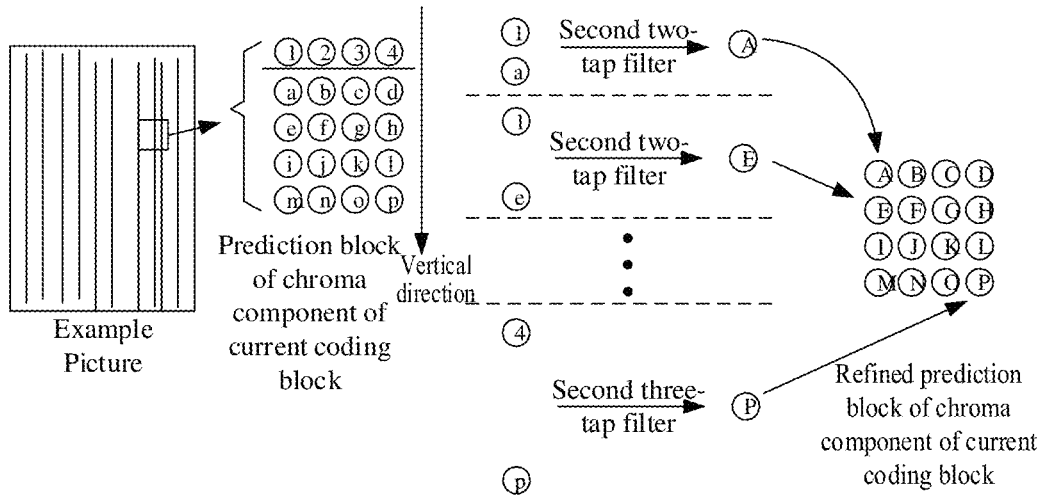
FIG. 12C is a schematic diagram of a down-sampling process in a vertical direction according to an embodiment of the present disclosure.

For example, during a down-sampling process in the vertical direction in a 4*4 pixel array as shown in FIG. 12C, taking the pixels in the PB of the chroma component and the upper boundary neighbouring pixels an examples, first, a pixel A of the refined PB of the chroma component is formed by performing down-sampling on the pixel a and the upper boundary neighbouring pixel 1 by using the first two-tap filter; in the vertical direction, a pixel E of the refined PB of the chroma component is formed by performing down-sampling on the pixel e and the upper boundary neighbouring pixel 1 by using the first two-tap filter; and the so on, until a pixel P of the refined PB of the chroma component is formed by performing down-sampling on the pixel p and the upper boundary neighbouring pixel 4 by using the first two-tap filter.

In this possible example, the second filter includes a second two-tap filter. The second two-tap filter satisfies the following:

$$P'(x,y)=f(y)\cdot P(x,-1)+(1-f(y))\cdot P(x,y).$$

Where x and y are coordinates of the current pixel; the value of x does not exceed the value range of the width of the CCB, and the value of y does not exceed the value range of the height of the CCB; $P'(x, y)$ is a final prediction sample of the pixel $(x, y)$ of the PB of the chroma component of the CCB; $P(x, -1)$ is a reconstructed sample of a pixel located at column x and neighbouring the upper boundary; $f(y)$ is a vertical filtering coefficient of the reference pixel $P(x, -1)$ of the pixel $(x, y)$; and $P(x, y)$ is an original prediction sample of the pixel $(x, y)$.

In this possible example, the vertical filtering coefficient is determined by means of a second parameter set; and the second parameter set comprises a size of the PB of the chroma component and a distance between the pixel $(x, y)$ and the pixel $P(x, -1)$.

The value of the above vertical filtering coefficient is related to a size of the chroma component of the CCB and distances between the predicted pixel in the PB of the current chroma component and the left neighbouring pixels. Specifically, selection of the filtering coefficient is related to the size of the chroma component. Different filter coefficient groups are partitioned according to the size of the PB of the chroma component of the CCB. The corresponding filter coefficient group is selected according to the size of the PB of the current chroma component. The selection of the above vertical filtering coefficient is related to the distances between the prediction pixel and the upper neighbouring pixels. The distances between the currently-predicted pixel and the upper neighbouring pixels are used as index values, so as to select the corresponding filtering coefficient from the corresponding filter coefficient group. The intra chroma prediction filtering coefficients are specifically shown in Table 1.

In addition, the filter coefficients of the technology can reduce coefficient storage by means of coefficient truncation. That is to say, all currently-predicted pixels that have a distance of greater than 10 from the left neighbouring pixels have a same filter coefficient During specific implementation, after the refined PB of the chroma component of the CCB is determined, the device may further calculate a reconstructed block of the chroma component, and then determines the reconstruction picture block of the CCB according to the reconstructed block of the chroma component and the reconstructed block of the luma component.

It can be seen that, in the embodiments of the present disclosure, compared with the conventional technology, in the solution of the present disclosure, in a CCP mode, a prediction sample of a chroma component of each pixel is refined by means of taking the correlation of neighbouring pixels in an orthogonal direction into consideration, thereby improving the prediction accuracy and the coding efficiency.

In a possible example, the operation of performing prediction refinement on the PB of the chroma component of the CCB includes actions of calculating a first rate distortion cost in a case that the CCB is not refined, and calculating a second rate distortion cost in a case that the CCB is refined; determining that the first rate distortion cost is greater than the second rate distortion cost; and performing prediction refinement on the PB of the chroma component of the CCB.

It can be seen that, in this example, the number of calculations of the rate distortion cost is not increased, and no additional calculations of the rate distortion cost are required, thereby avoiding a significant increase in computation complexity.

In a possible example, the prediction refinement is indicated by means of an existing flag bit. No additional flag bits are added, so that transmission bitstreams can be saved.

Alternatively, the prediction refinement is indicated by means of an independent flag bit. Therefore, clearer and efficient indication can be achieved. If the chroma component of the CCB is predicted by using the enhanced TSCPM, the flag bit is used to indicate whether the CCB uses the intra chroma component prediction filtering technology or not.

In a possible example, the above linear model applicable to the CCB can be replaced with a linear model applicable line by line.

Figure 13:
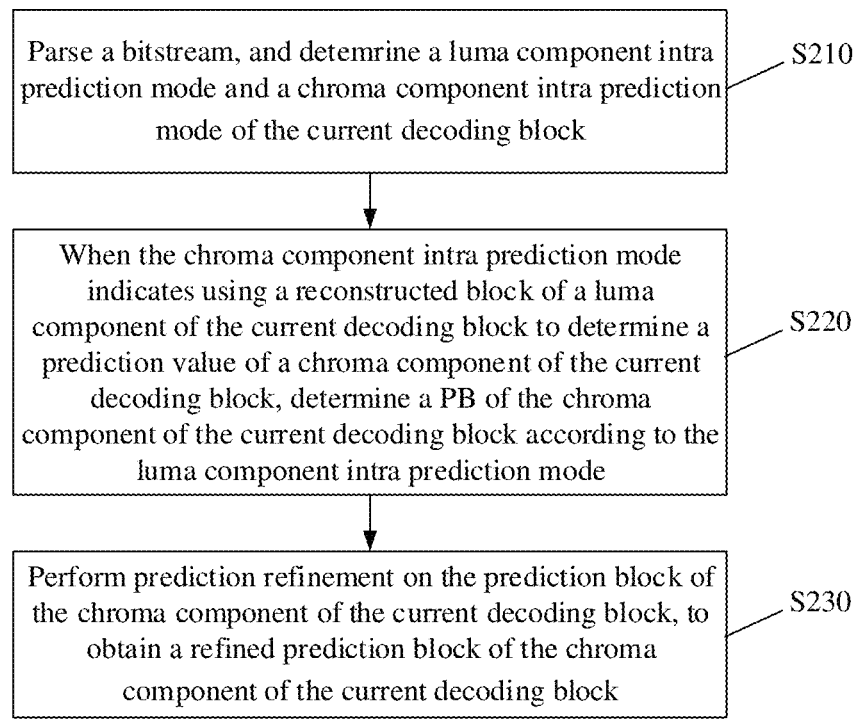
FIG. 13 is a flowchart of a picture decoding method according to an embodiment of the present disclosure.

Corresponding to the picture coding method shown in FIG. 12A, FIG. 13 is a flowchart of a picture coding method according to an embodiment of the present disclosure. The picture coding method may be applied to the destination apparatus 20 in the video decoding system 1 shown in FIG. 9 or the video decoder 200 shown in FIG. 11. The process shown in FIG. 13 is described by exemplarily taking the video coder 200 shown in FIG. 11 as an executive body. As shown in FIG. 13, the CCP method provided in the embodiments of the present disclosure includes the following operations.

At S210, a bitstream is parsed, and a luma component intra prediction mode and a chroma component intra prediction mode of the CDB are determined.

The colour format of the video of the bitstream includes, but is not limited to, 4:2:0, 4:2:2, and the like.

During specific implementation, the bitstream is entropically decoded to obtain a syntax element. The syntax element is used to determine the luma component intra prediction mode and the chroma component intra prediction mode for predicting the CDB. The luma component intra prediction mode is an optimal luma component intra prediction mode among a plurality of intra prediction modes. The plurality of intra prediction modes are the intra prediction modes used for intra prediction of the luma component.

At S220, when the chroma component intra prediction mode indicates using a reconstructed block of a luma component of the CDB to determine a prediction value of a chroma component of the CDB, according to the luma component intra prediction mode, a PB of the chroma component of the CDB is determined.

In this possible example, the operation of determining the PB of the chroma component of the CDB according to the luma component intra prediction mode includes actions of determining a reference PB of the chroma component of the CDB according to the luma component intra prediction mode; and filtering the reference PB of the chroma component of the CDB, to obtain the PB of the chroma component of the CDB.

During implementation, the device may, insofar as determining that the luma component intra prediction mode is a preset intra prediction mode, determine that the chroma component intra prediction mode indicates using the luma component of the CDB to determine the chroma component of the CDB. The preset intra prediction mode is the luma component intra prediction mode in a preset direction. The preset direction includes, but is not limited to, a horizontal direction (for example, in an X-axis direction in a two-dimensional rectangular coordinate system XoY depicted in FIG. 1), and a vertical direction (for example, in a negative direction along a Y-axis in the two-dimensional rectangular coordinate system XoY depicted in FIG. 1).

In this possible example, the operation of filtering the reference PB of the chroma component of the CDB includes an action of filtering the reference PB of the chroma component of the CDB by using a third filter.

In this possible example, the third filter includes a filter that is configured to filter a left boundary pixel region of the reference PB of the chroma component and a filter that is configured to filter a non-left boundary pixel region of the reference PB of the chroma component.

In this possible example, the filter that is configured to filter the left boundary pixel region of the reference PB of the chroma component comprises a third two-tap filter. The third two-tap filter satisfies the following:

$$P_C(x,y)=(P'_C(2x,2y)+P'_C(2x,2y+1)+1)>>1.$$

Where x and y are coordinates of a pixel; $P'_C$ is a prediction sample of the pixel in the reference PB of the chroma component; and $P_C$ is a prediction sample of the chroma component of the current pixel in the PB of the chroma component.

In this possible example, the filter that is configured to filter the non-left boundary pixel region of the reference PB of the chroma component comprises a first six-tap filter. The first six-tap filter includes the following:

$$P_C(x, y) = \left( \begin{array}{c} 2 \times P'_C(2x, 2y) + 2 \times P'_C(2x, 2y+1) + P'_C(2x-1, 2y) + \\ P'_C(2x+1, 2y) + P'_C(2x-1, 2y+1) + P'_C(2x+1, 2y-1) + 4 \end{array} \right) \gg 3.$$

Where x and y are coordinates of the current pixel; $P'_C$ is the prediction sample of the pixel in the reference PB of the chroma component; and $P_C$ is the prediction sample of the chroma component of the current pixel in the PB of the chroma component.

In this possible example, the operation of determining the reference PB of the chroma component of the CDB according to the luma component intra prediction mode includes actions of determining a reconstructed block of the luma component of the CDB according to the luma component intra prediction mode; and determining the reference PB of the chroma component of the CDB according to the reconstructed block of the luma component of the CDB.

The size of the reference PB of the chroma component is the same as the size of the reconstructed block of the luma component. For example, the reconstructed block of the luma component and the reference PB of the chroma component during the prediction process shown in FIG. 8 are both 8*8 pixel arrays.

In this possible example, the operation of determining the reference PB of the chroma component of the CDB according to the reconstructed block of the luma component of the CDB includes actions of determining a linear model that uses the reconstructed block of the luma component of the CDB to perform CCP; and calculating the reconstructed block of the luma component according to the linear model, to obtain the reference PB of the chroma component of the CDB.

The linear mode may be, for example, the linear model shown in the foregoing formula (1) or (2) or (3).

In this possible example, the operation of determining the linear model that uses the reconstructed block of the luma component of the CDB to perform CCP includes actions of determining a reference pixel for calculating the linear model, where the reference pixel includes at least one neighbouring pixel of the CDB; and calculating the linear model according to the reference pixel.

The selection of the reference pixel for calculating the linear model can be extended to the neighbouring pixels on the lower left side, left side, upper left side, upper side, and upper right side of the CDB.

In this possible example, the operation of determining the reference pixel for calculating the linear model includes: determining the reference pixel for calculating the linear model according to available information of the reconstructed samples of the neighbouring pixels of the CDB and the chroma component intra prediction mode.

The intra prediction mode of the chroma component of the CDB includes any one of TSCPM_T, TSCPM_L, MPCM_T, or MPCM_L. The available information specifically includes both sides available and single side available (for example, left side available and right side available). It can be seen that, in this example, the reference neighbouring pixel for calculating the coefficients of the linear model can be set flexibly according to the availability of the reconstructed samples of neighbouring pixels and the intra prediction mode of the chroma component.

In this possible example, the operation of determining the reference pixel for calculating the linear model includes actions of determining the reference pixel for calculating the linear model according to the luma component intra prediction mode with an optimal rate distortion cost of the neighbouring decoding block of the CDB. The intra prediction mode with the optimal rate distortion cost of the luma component of the neighbouring decoding block may be the same as or different from the intra prediction mode with the optimal rate distortion cost of the luma component of the CDB.

At S230, prediction refinement is performed on the PB of the chroma component of the CDB, so as to obtain a refined PB of the chroma component of the CDB.

In this possible example, the operation of performing prediction refinement on the PB of the chroma component of the CDB includes actions of determining a filter according to the chroma component intra prediction mode; and performing prediction refinement on the PB of the chroma component of the CDB by using the filter.

A filtering direction of the filter is orthogonal to the direction of the neighbouring pixels for calculating the linear model in the chroma component intra prediction mode relative to the CCB, so that the prediction sample of the chroma component of each pixel is can be predicted by means of taking the correlation of the boundary neighbouring pixels in the orthogonal direction into consideration.

In this possible example, the operation of determining the filter according to the chroma component intra prediction mode includes an action of setting the filter as a first filter when the chroma component intra prediction mode is a TSCPM_T or an MPCM_T.

In this possible example, the first filter is configured to filter a pixel region neighbouring a left boundary of the PB of the chroma component of the CDB and a pixel region of the PB of the chroma component of the CDB.

In this possible example, the first filter includes a first two-tap filter. The first two-tap filter satisfies the following:

$$P'(x,y)=f(x) \cdot P(-1,y)+(1-f(x)) \cdot P(x,y).$$

Where, x and y are coordinates of a current pixel; the value of x does not exceed a value range of the width of the CCB, and the value of y does not exceed a value range of the height of the CCB; P'(x, y) is a final prediction sample of the pixel (x, y) of the PB of the chroma component of the CCB; P(−1, y) is a reconstructed sample of a pixel located at row y and neighbouring the left boundary; f(x) is a horizontal filtering coefficient of the reference pixel P(−1, y) of the pixel (x, y); and P(x, y) is an original prediction sample of the pixel (x, y).

In this possible example, the horizontal filtering coefficient is determined by means of a first parameter set; and the first parameter set comprises a size of the PB of the chroma component and a distance between the pixel (x, y) and the pixel P(−1, y).

In this possible example, the operation of determining the filter according to the chroma component intra prediction mode includes the following operation.

When the chroma component intra prediction mode is a TSCPM_T or an MPCM_T, the filter is set as a second filter.

In this possible example, the second filter is configured to filter a pixel region neighbouring an upper boundary of the PB of the chroma component of the CDB and a pixel region of the PB of the chroma component of the CDB.

In this possible example, the second filter includes a second two-tap filter. The second two-tap filter satisfies the following:

$$P'(x,y)=f(y) \cdot P(x,-1)+(1-f(y)) \cdot P(x,y).$$

Where x and y are coordinates of the current pixel; the value of x does not exceed the value range of the width of the CCB, and the value of y does not exceed the value range of the height of the CCB; P'(x, y) is a final prediction sample of the pixel (x, y) of the PB of the chroma component of the CCB; P(x, −1) is a reconstructed sample of a pixel located at column x and neighbouring the upper boundary; f(y) is a vertical filtering coefficient of the reference pixel P(x, −1) of the pixel (x, y); and P(x, y) is an original prediction sample of the pixel (x, y).

In this possible example, the vertical filtering coefficient is determined by means of a second parameter set; and the second parameter set comprises a size of the PB of the chroma component and a distance between the pixel (x, y) and the pixel P(x, −1).

The value of the above vertical filtering coefficient is related to a size of the chroma component of the CDB and a distance between the predicted pixel in the PB of the current chroma component and the left neighbouring pixels.

Specifically, the selection of the filtering coefficient is related to the size of the chroma component. Different filter coefficient groups are partitioned according to the size of the PB of the chroma component of the CDB. The corresponding filter coefficient group is selected according to the size of the PB of the current chroma component. The selection of the above vertical filtering coefficient is related to the distance between the prediction pixel and the upper neighbouring pixels. The distance between the currently-predicted pixel and the upper neighbouring pixels is used as the index value, so as to select the corresponding filtering coefficient from the corresponding filter coefficient group. The intra chroma prediction filtering coefficients are specifically shown in Table 1.

In addition, the filter coefficients of the technology can reduce coefficient storage by means of coefficient truncation. That is to say, all currently-predicted pixels that have a distance of greater than 10 from the upper neighbouring pixels have the same filter coefficient.

During specific implementation, after the PB of the chroma component of the CDB is determined, the device may further calculate the reconstructed block of the chroma component, and then determines the reconstruction picture of the CDB according to the reconstructed block of the chroma component and the reconstructed block of the luma component.

It can be seen that, in the embodiments of the present disclosure, compared with the conventional technology, in the solution of the present disclosure, in a CCP mode, a prediction sample of a chroma component of each pixel is refined by means of taking the correlation in an orthogonal direction into consideration, thereby improving the prediction accuracy and the coding efficiency.

In this possible example, the operation of performing prediction refinement on the PB of the chroma component of the CDB includes actions of parsing the bitstream to obtain a flag bit; determining that the flag bit indicates using the filter to perform prediction refinement; and performing prediction refinement on the PB of the chroma component of the CDB. It can be seen that, in this example, prediction refinement is directly indicated by means of the flag bit.

In a possible example, the prediction refinement is indicated by means of an existing flag bit. No additional identification bits are added, so that transmission bitstreams can be saved.

Alternatively, the prediction refinement is indicated by means of an independent flag bit. Therefore, clearer and efficient indication can be achieved. If the chroma component of the CDB uses the enhanced TSCPM, the flag bit is used to indicate whether the CDB uses the intra chroma component prediction filtering technology or not.

The proposed technology is implemented on AVS reference software HPM6.0, and 1-second sequence test is performed in a full intra mode and a random access mode respectively under general testing conditions and video sequences. Specific performance is shown in Table 2 and Table 3.

TABLE 2

All Intra testing results

| Class | Y | U | V |
|---|---|---|---|
| General A 4k | −0.04% | −0.49% | −0.21% |
| General B 1080 p | −0.01% | −0.36% | −0.35% |
| General C 720 p | −0.02% | −0.17% | −0.35% |
| General average | −0.03% | −0.34% | −0.30% |

TABLE 3

Random Access testing results

| Class | Y | U | V |
|---|---|---|---|
| General A 4k | −0.04% | −0.50% | 0.02% |
| General B 1080 p | −0.06% | −0.15% | 0.02% |
| General C 720 p | −0.06% | −0.53% | −0.85% |
| General average | −0.06% | −0.39% | −0.27% |

As can be seen from Table 2 and Table 3, the UV component of the test sequence has an average performance gain of over 0.3%, and the Y component has an average performance gain of 0.06% under the RA testing conditions.

An embodiment of the present disclosure provides a picture coding apparatus. The picture coding apparatus may be a video decoder or a video coder. Specifically, the picture coding apparatus is configured to execute operations in the above decoding method that are executed by the video decoder. The picture coding apparatus provided in this embodiment of the present disclosure may include modules corresponding to the corresponding operations.

In this embodiment of the present disclosure, functional module division may be performed on the picture coding apparatus according to the above method examples. For example, functional modules may be divided according to corresponding functions, and two or more functions may be integrated in one processing module. The above integrated module may be implemented in a form of hardware, or may be implemented in a form of a software functional module. The module division in this embodiment of the present disclosure is exemplary, and is merely logical function division. During actual implementation, the modules may be divided in other manners.

Figure 14:
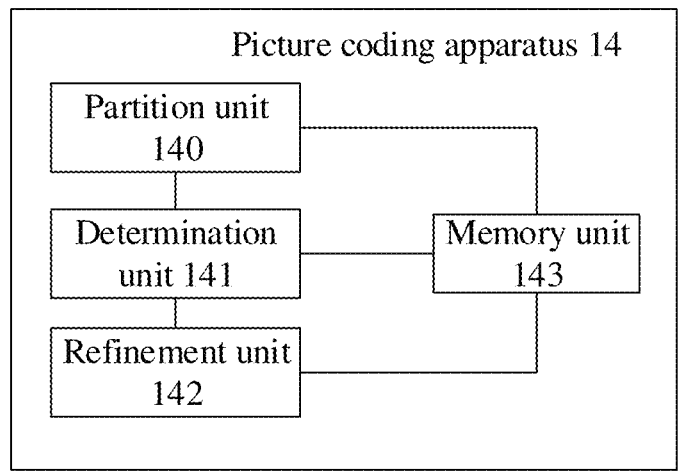
FIG. 14 is a block diagram of a functional unit of a picture coding apparatus according to an embodiment of the present disclosure.

FIG. 14 shows a possible schematic structural diagram of the picture coding apparatus mentioned in the above embodiments when the function modules are divided according to the corresponding functions. As shown in FIG. 14, the picture coding apparatus 14 includes a partition unit 140, a determination unit 141 and a refinement unit 142.

The partition unit 140 is configured to partition a picture, and determine a luma component intra prediction mode and a chroma component intra prediction mode of the CCB.

The determination unit 141 is configured to, when the chroma component intra prediction mode indicates using a luma component of the CCB to determine a prediction value of a chroma component of the CCB, determine a PB of the chroma component of the CCB according to the luma component intra prediction mode.

The refinement unit 142 is configured to perform prediction refinement on the PB of the chroma component of the CCB, so as to obtain a refined PB of the chroma component of the CCB.

In this possible example, in an aspect of performing prediction refinement on the PB of the chroma component of the CCB, the refinement unit 142 is specifically configured to: determine a filter according to the chroma component intra prediction mode; and perform prediction refinement on the PB of the chroma component of the CCB by using the filter.

In this possible example, in an aspect of determining the filter according to the chroma component intra prediction mode, the refinement unit 142 is specifically configured to: when the chroma component intra prediction mode is a TSCPM_T or a MPCM_T, set the filter as a first filter.

In this possible example, the first filter is configured to filter a pixel region neighbouring a left boundary of the PB of the chroma component of the CCB and a pixel region of the PB of the chroma component of the CCB.

In this possible example, the first filter includes a first two-tap filter.

The first two-tap filter satisfies the following:

$$P'(x,y)=f(x) \cdot P(-1,y)+(1-f(x)) \cdot P(x,y),$$

where x and y are coordinates of a current pixel; a value of x does not exceed a value range of a width of the CCB, and a value of y does not exceed a value range of a height of the CCB; P'(x, y) is a final prediction sample of a pixel (x, y) of the PB of the chroma component of the CCB; P(−1, y) is a reconstructed sample of a pixel located at row y and neighbouring the left boundary; f(x) is a horizontal filtering coefficient of a reference pixel P(−1, y) of the pixel (x, y); and P(x, y) is an original prediction sample of the pixel (x, y).

In this possible example, the horizontal filtering coefficient is determined by means of a first parameter set; and the first parameter set comprises a size of the PB of the chroma component and a distance between the pixel (x, y) and the pixel P(−1, y).

In this possible example, in an aspect of determining the filter according to the chroma component intra prediction mode, the refinement unit 142 is specifically configured to: when the chroma component intra prediction mode is a TSCPM_L or MPCM_L, set the filter as a second filter.

In this possible example, the second filter is configured to filter a pixel region neighbouring an upper boundary of the PB of the chroma component of the CCB and a pixel region of the PB of the chroma component of the CCB.

In this possible example, the second filter includes a second two-tap filter.

The second two-tap filter satisfies the following:

$$P'(x,y)=f(x){\cdot}P(-1,y)+(1-f(x)){\cdot}P(x,y),$$

Where x and y are coordinates of the current pixel; a value of x does not exceed a value range of a width of the CCB, and a value of y does not exceed a value range of a height of the CCB; P'(x, y) is a final prediction sample of a pixel (x, y) of the PB of the chroma component of the CCB; P(x, −1) is a reconstructed sample of a pixel located at an column x and neighbouring the upper boundary; f(y) is a vertical filtering coefficient of a reference pixel P(x, −1) of the pixel (x, y); and P(x, y) is an original prediction sample of the pixel (x, y).

In this possible example, the vertical filtering coefficient is determined by means of a second parameter set; and the second parameter set comprises a size of the PB of the chroma component and a distance between the pixel (x, y) and the pixel P(x, −1).

In a possible example, in an aspect of performing prediction refinement on the PB of the chroma component of the CCB, the refinement unit 142 is specifically configured to: calculate a first rate distortion cost in a case that n the CCB is not refined, and calculate a second rate distortion cost in a case that the CCB is refined; determine that the first rate distortion cost is greater than the second rate distortion cost; and perform prediction refinement on the PB of the chroma component of the CCB.

In a possible example, the prediction refinement is indicated by means of an existing flag bit.

The prediction refinement is indicated by means of an independent flag bit.

In this possible example, in an aspect of determining the PB of the chroma component of the CCB, according to the luma component intra prediction mode, the determination unit 141 is specifically configured to: determine a reference PB of the chroma component of the CCB; and filter the reference PB of the chroma component of the CCB according to the luma component intra prediction mode, to obtain the PB of the chroma component of the CCB.

In this possible example, in an aspect of filtering the reference PB of the chroma component of the CCB, the determination unit 141 is specifically configured to filter the reference PB of the chroma component of the CCB by using a third filter.

In this possible example, the third filter includes a filter that is configured to filter a left boundary pixel region of the reference PB of the chroma component and a filter that is configured to filter a non-left boundary pixel region of the reference PB of the chroma component.

In this possible example, the filter that is configured to filter the left boundary pixel region of the reference PB of the chroma component comprises a third two-tap filter.

The third two-tap filter satisfies the following:

$$P_C(x,y)=(P'_C(2x,2y)+P'_C(2x,2y+1)+1)>>1.$$

Where x and y are coordinates of a pixel; $P'_C$ is a prediction sample of the pixel in the reference PB of the chroma component; and $P_C$ is a prediction sample of the chroma component of the current pixel in the PB of the chroma component.

In this possible example, the filter that is configured to filter the left boundary pixel region of the reference PB of the chroma component comprises a first six-tap filter.

The first six-tap filter satisfies the following:

$$P_C(x, y) = \left( \begin{array}{l} 2\times P'_C(2x, 2y) + 2\times P'_C(2x, 2y+1) + P'_C(2x-1, 2y) + \\ P'_C(2x+1, 2y) + P'_C(2x-1, 2y+1) + P'_C(2x+1, 2y-1) + 4 \end{array} \right) >> 3.$$

Where x and y are coordinates of the current pixel; $P'_C$ is the prediction sample of the pixel in the reference PB of the chroma component; and $P_C$ is the prediction sample of the chroma component of the current pixel in the PB of the chroma component.

In this possible example, in an aspect of determining the reference PB of the chroma component of the CCB according to the luma component intra prediction mode, the determination unit 141 is specifically configured to: determine a reconstructed block of the luma component of the CCB according to the luma component intra prediction mode; and determine the reference PB of the chroma component of the CCB according to the reconstructed block of the luma component of the CCB.

In this possible example, in an aspect of determining the reference PB of the chroma component of the CCB according to the reconstructed block of the luma component of the CCB, the determination unit 141 is specifically configured to: determine a linear model, which performs Cross Component Prediction (CCP) by using the reconstructed block of the luma component of the CCB; and calculate the reconstructed block of the luma component according to the linear model, so as to obtain the reference PB of the chroma component of the CCB.

In this possible example, in an aspect of determining the linear model, which performs Cross Component Prediction (CCP) by using the reconstructed block of the luma component of the CCB, the determination unit 141 is specifically configured to: determine a reference pixel used for calculating the linear model, where the reference pixel includes at least one neighbouring pixel of the CDB; and calculate the linear model according to the reference pixel.

In this possible example, in an aspect of determining the reference pixel used for calculating the linear model, the determination unit 141 is specifically configured to: determining, according to available information of the reconstructed sample of the neighbouring pixel of the CCB and the chroma component intra prediction mode, the reference pixel for calculating the linear model.

In this possible example, in an aspect of determining the reference pixel for calculating the linear model, the determination unit 141 is specifically configured to: determine, according to a luma component intra prediction mode of a neighbouring coding block of the CCB with an optimum rate distortion cost, the reference pixel for calculating the linear model.

All relevant contents of operations involved in the above method embodiments can be cited to the functional description of the corresponding functional modules, and details are not described herein again. Definitely, the picture coding apparatus provided in this embodiment of the present disclosure includes, but is not limited to, the above modules. For example, the picture coding apparatus may further include a storage unit 143. The storage unit 143 may be configured to store a program code and data of the picture coding apparatus.

Figure 15:
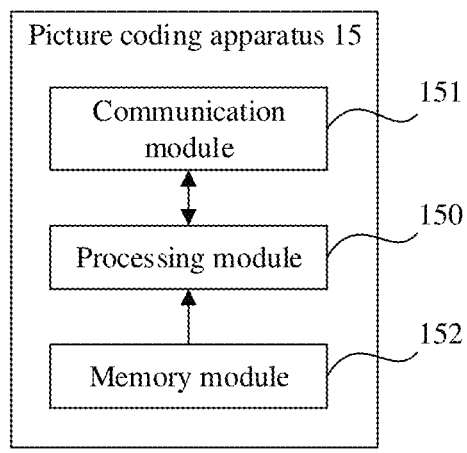
FIG. 15 is a block diagram of another functional unit of a picture coding apparatus according to an embodiment of the present disclosure.

When an integrated unit is used, a schematic structural diagram of the picture coding apparatus provided in this embodiment of the present disclosure is shown in FIG. 15.

In FIG. 15, the picture coding apparatus 15 includes a processing module 150 and a communication module 151. The processing module 150 is configured to control and manage actions of the picture coding apparatus, for example, execute operations that are executed by a partition unit 140, a determination unit 141 and a refinement unit 142, and/or other processes used for executing the technologies described herein. The communication module 151 is configured to support the interaction between the picture coding apparatus and other devices. As shown in FIG. 15, the picture coding device may further include a storage module 152. The storage module 152 is configured to store a program code and data of the picture coding apparatus, for example, store contents saved by the storage unit 143.

The processing module 150 may be a processor or a controller, which may be, for example, a Central Processing Unit (CPU), a general processor, a Digital Signal Processor (DSP), an ASIC, FPGA, or other programmable logic devices, transistor logic devices, hardware components or any combinations thereof. The processing module can implement or execute various exemplary logical blocks, modules and circuits described in combination with the present disclosure. The processor may also be a combination for realizing a computing function, for example, a combination including one or more microprocessors, a combination of the DSP and the microprocessor or the like. The communication module 151 may be a transceiver, an RF circuit or a communication interface. The storage module 152 may be a memory.

All relevant contents of scenarios involved in the above method embodiments can be cited to the functional description of the corresponding functional modules, and details are not described herein again. Both the above picture coding apparatus 14 and the picture coding apparatus 15 can execute the picture coding method shown in FIG. 12A. The picture coding apparatus 14 and the picture coding apparatus 15 can specifically be video picture coding apparatuses or other devices with video coding functions.

The present disclosure further provides a video coder, including a non-volatile storage medium and a CPU. The non-volatile storage medium stores an executable program. The CPU is connected to the non-volatile storage medium, and executes the executable program to implement the picture coding method of the embodiments of the present disclosure.

An embodiment of the present disclosure provides a picture decoding apparatus. The picture decoding apparatus may be a video decoder or a video coder. Specifically, the picture decoding apparatus is configured to execute operations in the above decoding method that are executed by the video decoder. The picture decoding apparatus provided in this embodiment of the present disclosure may include modules corresponding to the corresponding operations.

In this embodiment of the present disclosure, functional module division may be performed on the picture decoding apparatus according to the above method examples. For example, functional modules may be divided according to corresponding functions, and two or more functions may be integrated in one processing module. The above integrated module may be implemented in a form of hardware, or may be implemented in a form of a software functional module. The module division in this embodiment of the present disclosure is exemplary, and is merely logical function division. During actual implementation, the modules may be divided in other manners.

Figure 16:
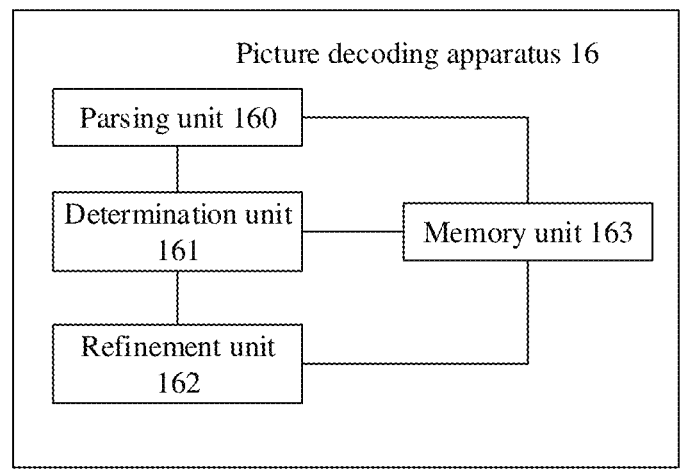
FIG. 16 is a block diagram of a functional unit of a picture decoding apparatus according to an embodiment of the present disclosure.

FIG. 16 shows a possible schematic structural diagram of the picture decoding apparatus mentioned in the above embodiments when the function modules are partitioned according to the corresponding functions. As shown in FIG. 16, the picture decoding apparatus 16 includes a parsing unit 160, a determination unit 161 and a refinement unit 162.

The parsing unit 160 is configured to parse a bitstream, and determine a luma component intra prediction mode and a chroma component intra prediction mode of the CDB.

The determination unit 161 is configured to, when the chroma component intra prediction mode indicates using a luma component of the CDB to determine a prediction value of a chroma component of the CDB, determine a Prediction Block (PB) of the chroma component of the CDB according to the luma component intra prediction mode.

The refinement unit 162 is configured to perform prediction refinement on the PB of the chroma component of the CDB, to obtain a refined PB of the chroma component of the CDB.

In a possible example, in an aspect of performing prediction refinement on the PB of the chroma component of the CDB, the refinement unit 162 is specifically configured to: determine a filter according to the chroma component intra prediction mode; and perform prediction refinement on the PB of the chroma component of the CDB by using the filter.

In a possible example, in an aspect of determining the filter according to the chroma component intra prediction mode, the refinement unit 162 is specifically configured to: when the chroma component intra prediction mode is a TSCPM_T or MPCM_T, set the filter as a first filter.

In a possible example, the first filter is configured to filter a pixel region neighbouring a left boundary of the PB of the chroma component of the CDB and a pixel region of the PB of the chroma component of the CDB.

In a possible example, the first filter includes a first two-tap filter.

the first two-tap filter satisfies:

$$P'(x,y)=f(x) \cdot P(-1,y)+(1-f(x)) \cdot P(x,y).$$

Where x and y are coordinates of a current pixel; a value of x does not exceed a value range of a width of the CDB, and a value of y does not exceed a value range of a height of the CDB; P'(x, y) is a final prediction sample of a pixel (x, y) of the PB of the chroma component of the CDB; P(−1, y) is a reconstructed sample of a pixel located at row y and neighbouring the left boundary; f(x) is a horizontal filtering coefficient of a reference pixel P(−1, y) of the pixel (x, y); and P(x, y) is an original prediction sample of the pixel (x, y).

In a possible example, the horizontal filtering coefficient is determined by means of a first parameter set; and the first parameter set comprises a size of the PB of the chroma component and a distance between the pixel (x, y) and the pixel P(−1, y).

In a possible example, the operation of determining the filter according to the chroma component intra prediction mode includes the following operation.

When the chroma component intra prediction mode is a TSCPM_T or an MPCM_T, the filter is set as a second filter.

In a possible example, the second filter is configured to filter a pixel region neighbouring an upper boundary of the PB of the chroma component of the CDB and a pixel region of the PB of the chroma component of the CDB.

In a possible example, the second filter includes a second two-tap filter.

The second two-tap filter satisfies the following:

$$P'(x,y)=f(y) \cdot P(x,-1)+(1-f(y)) \cdot P(x,y).$$

Where x and y are coordinates of the current pixel; a value of x does not exceed a value range of a width of the CDB, and a value of y does not exceed a value range of a height of the CDB; P'(x, y) is a final prediction sample of a pixel (x, y) of the PB of the chroma component of the CDB; P(x, −1) is a reconstructed sample of a pixel located at an column x and neighbouring the upper boundary; f(y) is a vertical filtering coefficient of a reference pixel P(x, −1) of the pixel (x, y); and P(x, y) is an original prediction sample of the pixel (x, y).

In a possible example, the vertical filtering coefficient is determined by means of a second parameter set; and the second parameter set comprises a size of the PB of the chroma component and a distance between the pixel (x, y) and the pixel P(x, −1).

In a possible example, in an aspect of performing prediction refinement on the PB of the chroma component of the CDB, the refinement unit 162 is specifically configured to: parse the bitstream to obtain a flag bit; determine that the flag bit indicates using the filter to perform prediction refinement; and perform the prediction refinement on the PB of the chroma component of the CDB.

In a possible example, the prediction refinement is indicated by means of an existing flag bit.

The prediction refinement is indicated by means of an independent flag bit.

In a possible example, in an aspect of determining the PB of the chroma component of the CDB according to the luma component intra prediction mode, the determination unit 161 is specifically configured to: determine a reference PB of the chroma component of the CDB according to the luma component intra prediction mode; and filter the reference PB of the chroma component of the CDB, so as to obtain the PB of the chroma component of the CDB.

In a possible example, in an aspect of filtering the reference PB of the chroma component of the CDB, the determination unit 161 is specifically configured to: filter the reference PB of the chroma component of the CDB by using a third filter.

In a possible example, the third filter includes a filter that is configured to filter a left boundary pixel region of the reference PB of the chroma component and a filter that is configured to filter a non-left boundary pixel region of the reference PB of the chroma component.

In a possible example, the filter that is configured to filter the left boundary pixel region of the reference PB of the chroma component comprises a third two-tap filter.

The third two-tap filter satisfies the following:

$$P_C(x,y)=(P'_C(2x,2y)+P'_C(2x,2y+1)+1)>>1.$$

Where x and y are coordinates of a pixel; $P'_C$ is a prediction sample of the pixel in the reference PB of the chroma component; and $P_C$ is a prediction sample of the chroma component of the current pixel in the PB of the chroma component.

In a possible example, the filter that is configured to filter the left boundary pixel region of the reference PB of the chroma component comprises a first six-tap filter.

The first six-tap filter satisfies the following:

$$P_C(x, y) = \left( \begin{array}{l} 2 \times P'_C(2x, 2y) + 2 \times P'_C(2x, 2y+1) + P'_C(2x-1, 2y) + \\ P'_C(2x+1, 2y) + P'_C(2x-1, 2y+1) + P'_C(2x+1, 2y-1) + 4 \end{array} \right) >> 3.$$

Where x and y are coordinates of the current pixel; $P'_C$ is the prediction sample of the pixel in the reference PB of the chroma component; and $P_C$ is the prediction sample of the chroma component of the current pixel in the PB of the chroma component.

In a possible example, in an aspect of determining the reference PB of the chroma component of the CDB according to the luma component intra prediction mode, the determination unit 161 is specifically configured to: determine a reconstructed block of the luma component of the CDB according to the luma component intra prediction mode; and determine the reference PB of the chroma component of the CDB according to the reconstructed block of the luma component of the CDB.

In a possible example, in an aspect of determining the reference PB of the chroma component of the CDB according to the reconstructed block of the luma component of the CDB, the determination unit 161 is specifically configured to: determine a linear model, which performs Cross Component Prediction (CCP) by using the reconstructed block of the luma component of the CDB; and calculate the reconstructed block of the luma component according to the linear model, to obtain the reference PB of the chroma component of the CDB.

In a possible example, in an aspect of determining the linear model, which performs Cross Component Prediction (CCP) by using the reconstructed block of the luma component of the CDB, the determination unit 161 is specifically configured to: determine a reference pixel for calculating the linear model, wherein the reference pixel comprises at least one neighbouring pixel of the CDB; and calculate the linear model according to the reference pixel.

In a possible example, in an aspect of determining the reference pixel used for calculating the linear model, the determination unit 161 is specifically configured to: determine, according to available information of the reconstructed sample of the neighbouring pixel of the CDB and the chroma component intra prediction mode, the reference pixel for calculating the linear model.

In a possible example, in an aspect of determining the reference pixel for calculating the linear model, the determination unit 161 is specifically configured to: determine, according to a luma component intra prediction mode of a neighbouring coding block of the CDB with an optimum rate distortion cost, the reference pixel for calculating the linear model.

All relevant contents of operations involved in the above method embodiments can be cited to the functional description of the corresponding functional modules, and details are not described herein again. Definitely, the picture decoding apparatus provided in this embodiment of the present disclosure includes, but is not limited to, the above modules. For example, the picture decoding apparatus may further include a storage unit 163. The storage unit 163 may be configured to store a program code and data of the picture decoding apparatus.

Figure 17:
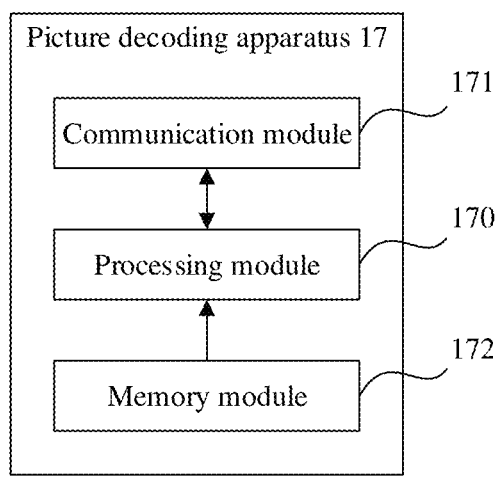
FIG. 17 is a block diagram of another functional unit of a picture decoding apparatus according to an embodiment of the present disclosure.

When an integrated unit is used, a schematic structural diagram of the picture decoding apparatus provided in this embodiment of the present disclosure is shown in FIG. 17. In FIG. 17, the picture decoding apparatus 17 includes a processing module 170 and a communication module 171. The processing module 170 is configured to control and manage actions of the picture decoding apparatus, for example, execute operations that are executed by a parsing unit 160, a determination unit 161 and a refinement unit 162, and/or other processes used for executing the technologies described herein. The communication module 171 is configured to support the interaction between the picture decoding apparatus and other devices. As shown in FIG. 15, the picture decoding device may further include a storage module 172. The storage module 172 is configured to store a program code and data of the picture decoding apparatus, for example, store contents saved by the storage unit 163.

The processing module 170 may be a processor or a controller, which may be, for example, a Central Processing Unit (CPU), a general processor, a Digital Signal Processor (DSP), an ASIC, FPGA, or other programmable logic devices, transistor logic devices, hardware components or any combinations thereof. The processing module can implement or execute various exemplary logical blocks, modules and circuits described in combination with the present disclosure. The processor may also be a combination for realizing a computing function, for example, a combination including one or more microprocessors, a combination of the DSP and the microprocessor or the like. The communication module 171 may be a transceiver, an RF circuit or a communication interface. The storage module 172 may be a memory.

All relevant contents of scenarios involved in the above method embodiments can be cited to the functional description of the corresponding functional modules, and details are not described herein again. Both the above picture decoding apparatus 16 and the picture decoding apparatus 17 can execute the picture decoding method shown in FIG. 13. The picture decoding apparatus 16 and the picture decoding apparatus 17 can specifically be video picture decoding apparatuses or other devices with video decoding functions.

The present disclosure further provides a video decoder, including a non-volatile storage medium and a CPU. The non-volatile storage medium stores an executable program. The CPU is connected to the non-volatile storage medium, and executes the executable program to implement the picture decoding method of the embodiments of the present disclosure.

The present disclosure further provides a terminal. The terminal includes one or more processors, a memory, and a communication interface. The memory and a communication interface are coupled to the one or more processors. The memory is configured to store a computer program code. The computer program code includes instructions. When the one or more processors execute the instructions, the terminal executes the picture coding method and/or picture decoding method of the embodiments of the present disclosure. The terminal here may be a video display device, a smart phone, a portable computer and other devices that can process videos or play the videos.

Another embodiment of the present disclosure further provides a computer-readable storage medium. The computer-readable storage medium includes one or more program codes. The one or more program codes include an instruction. When a processor in the decoding device executes the program codes, the decoding device executes the picture coding method or the picture decoding method of the embodiments of the present disclosure.

Another embodiment of the present disclosure further provides a computer program product. The computer program product includes a computer execution instruction. The computer execution instruction is stored in a computer-readable storage medium. At least one processor of a decoding device may read the computer execution instruction from the computer-readable storage medium. Then the at least one processor executes the computer execution instruction to cause a terminal to implement and execute the picture coding method or the picture decoding method of the embodiments of the present disclosure.

In the above embodiments, it may be implemented in whole or in part by software, hardware, firmware, or any combination thereof. When the software program is used for implementation, it may be implemented in whole or in part in the form of the computer program product. The computer program product includes one or more computer instructions. When the above computer program instruction is loaded and executed on a computer, the above processes or functions according to the embodiments of the present disclosure are generated in whole or in part.

The above computer may be a general computer, a special computer, a computer network, or other programmable apparatus. The above computer instruction may be stored in the computer-readable storage medium or transmitted from one computer-readable storage medium to another computer-readable storage medium. For example, the above computer instruction may be transmitted from a website site, a computer, a server, or a data center to another website site, another computer, another server, or another data center via wire (for example, a coaxial cable, an optical fiber, a Digital Subscriber Line (DSL)) or wireless (for example, infrared, wireless, microwave, or the like).

The computer-readable storage medium may be any available medium that can be accessed by a computer, or a data storage device, such as a server and a data center, that includes one or more available mediums integrated. The above available medium may be a magnetic medium (for example, a floppy disk, a hard disk, and a magnetic tape), an optical medium (for example, DVD), or a semiconductor medium (for example, Solid State Disk (SSD)), and the like.

By means of the description of the above implementations, it is clear to those skilled in the field that, for ease and briefness of description, only the above division of each functional module is given as an example. In practical applications, the above functions can be assigned to different functional modules as needed. That is to say the internal structure of the apparatus is partitioned into different functional modules to complete all or part of the above functions.

In several embodiments provided by the present disclosure, it is to be understood that the disclosed apparatus and method may be implemented in other ways. For example, the device embodiment described above is only schematic, and for example, division of the modules or units is only logic function division, and other division manners may be adopted during practical implementation. For another example, a plurality of units or components may be combined or integrated into another apparatus, or some characteristics may be neglected or not executed. In addition, the displayed or discussed mutual coupling or direct coupling or communication connection may be indirect coupling or communication connection through some interfaces, devices or units, and may be in electrical, mechanical or other forms.

The units described as separate components may or may not be physically separated. The components displayed as units may be a physical unit or a plurality of physical units. That is to say, the components may be located in one place, or may be distributed on a plurality of places. Part or all of the units may be selected according to actual requirements to achieve the purposes of the solutions of this embodiment.

In addition, the functional units in the various embodiments of the present disclosure may be integrated into one processing unit, or each unit may exist alone physically, or two or more than two units may be integrated into one unit.

The above integrated unit can be implemented in the form of hardware, or can be implemented in the form of a software functional unit.

If the integrated unit is implemented in the form of the software functional unit and sold or used as an independent product, it can be stored in the readable storage medium. Based on this understanding, the technical solutions of the embodiments of the present disclosure essentially or the parts that contribute to the conventional technology, or all or part of the technical solutions can be embodied in the form of a software product. The software product is stored in a storage medium, including a plurality of instructions for causing a device (which may be a one-chip computer, a chip, and the like) to execute all or part of the operations of the method described in the embodiments of the present disclosure. The storage medium includes: various media capable of storing program codes such as a U disk, a mobile Hard Disk Drive (HDD), a Read-Only Memory (ROM), a Random Access Memory (RAM), a magnetic disk or an optical disk. The above is only the specific implementations of the present disclosure and not intended to limit the scope of protection of the present disclosure. Any variations or replacements disclosed within the technical scope disclosed by the present disclosure shall fall within the scope of protection of the present disclosure. Therefore, the protection scope of the present disclosure shall be subject to the protection scope of the claims.

The invention claimed is:

1. A method for coding a picture, comprising:
partitioning the picture, and determining a luma component intra prediction mode and a chroma component intra prediction mode of a Current Coding Block (CCB), wherein the chroma component intra prediction mode is enhanced Two Step Cross-component Prediction Mode (TSCPM);
when the chroma component intra prediction mode indicates using a luma component of the CCB to determine a prediction value of a chroma component of the CCB, determining a Prediction Block (PB) of the chroma component of the CCB according to the luma component intra prediction mode; and
after the enhanced TSCPM, performing refinement on the PB of the chroma component of the CCB, to obtain a refined PB of the chroma component of the CCB,
wherein performing refinement on the PB of the chroma component of the CCB comprises:
determining a filter according to the chroma component intra prediction mode; and
filtering the PB of the chroma component of the CCB by using the filter,
wherein determining the filter according to the chroma component intra prediction mode comprises:
when the chroma component intra prediction mode is a Two Step Cross-component Prediction Mode TSCPM_T, setting the filter as a first filter,
wherein the first filter is configured to filter based on the prediction value of the PB of the chroma component of the CCB,
wherein the first filter comprises a first two-tap filter; and
the first two-tap filter satisfies:

$$P'(x,y)=f(x)\cdot P(-1,y)+(1-f(x))\cdot P(x,y)$$

wherein x and y are coordinates of a current pixel; a value of x does not exceed a value range of a width of the CCB, and a value of y does not exceed a value range of a height of the CCB; P'(x, y) is a prediction sample of a pixel (x, y) of the PB of the chroma component of the CCB; P(−1, y) is a reconstructed sample of a pixel located at row y and neighbouring the left boundary; f(x) is a horizontal filtering coefficient of a reference pixel P(−1, y) of the pixel (x, y); and P(x, y) is an original prediction sample of the pixel (x, y).

2. The method of claim 1, wherein the horizontal filtering coefficient is determined based on a first parameter set; and the first parameter set comprises a size of the PB of the chroma component and a distance between the pixel (x, y) and the pixel (−1, y).

3. A method for coding a picture, comprising:
partitioning the picture, and determining a luma component intra prediction mode and a chroma component intra prediction mode of a Current Coding Block (CCB), wherein the chroma component intra prediction mode is enhanced Two Step Cross-component Prediction Mode (TSCPM);
when the chroma component intra prediction mode indicates using a luma component of the CCB to determine a prediction value of a chroma component of the CCB, determining a Prediction Block (PB) of the chroma component of the CCB according to the luma component intra prediction mode; and
after the enhanced TSCPM, performing refinement on the PB of the chroma component of the CCB to obtain a refined PB of the chroma component of the CCB,
wherein performing refinement on the PB of the chroma component of the CCB comprises:
determining a filter according to the chroma component intra prediction mode; and
filtering the PB of the chroma component of the CCB by using the filter,
wherein determining the filter according to the chroma component intra prediction mode comprises:
when the chroma component intra prediction mode is a TSCPM_L, the filter is a second filter,
wherein the second filter is configured to filter a pixel region neighbouring an upper boundary of the PB of the chroma component of the CCB and a pixel region of the PB of the chroma component of the CCB,
wherein the second filter comprises a second two-tap filter; and
the second two-tap filter satisfies:

$$P'(x,y)=f(y)\cdot P(x,-1)+(1-f(y))\cdot P(x,y)$$

wherein x and y are coordinates of a current pixel; a value of x does not exceed a value range of a width of the CCB, and a value of y does not exceed a value range of a height of the CCB; P'(x, y) is a prediction sample of a pixel (x, y) of the PB of the chroma component of the CCB; P(x, −1) is a reconstructed sample of a pixel located at column x and neighboring the upper boundary; f(y) is a vertical filtering coefficient of a reference pixel P(x, −1) of the pixel (x, y); and P(x, y) is an original prediction sample of the pixel (x, y).

4. The method of claim 3, wherein the vertical filtering coefficient is determined by means of a second parameter set; and the second parameter set comprises a size of the PB of the chroma component and a distance between the pixel (x, y) and the pixel P(x, −1).

5. A method for decoding a picture, comprising:
parsing a bitstream, and determining a luma component intra prediction mode and a chroma component intra prediction mode of a Current Decoding Block (CDB), wherein the chroma component intra prediction mode is enhanced Two Step Cross-component Prediction Mode (TSCPM);

when the chroma component intra prediction mode indicates using a luma component of the CDB to determine a prediction value of a chroma component of the CDB, determining a Prediction Block (PB) of the chroma component of the CDB according to the luma component intra prediction mode; and after the enhanced TSCPM, performing refinement on the PB of the chroma component of the CDB, to obtain a refined PB of the chroma component of the CDB, wherein performing refinement on the PB of the chroma component of the CDB comprises:

determining a filter according to the chroma component intra prediction mode; and filtering the PB of the chroma component of the CDB by using the filter;

wherein determining the filter according to the chroma component intra prediction mode comprises:

when the chroma component intra prediction mode is a Two Step Cross-component Prediction Mode SCPM_T, the filter is a first filter, wherein the first filter is configured to filter based on a prediction value of the PB of the chroma component of the CDB, and wherein the first filter comprises a first two-tap filter; and the first two-tap filter satisfies:

$$P'(x,y)=f(x) \cdot P(-1,y)+(1-f(x)) \cdot P(x,y)$$

wherein x and y are coordinates of a current pixel; a value of x does not exceed a value range of a width of the CDB, and a value of y does not exceed a value range of a height of the CDB; P'(x, y) is a prediction sample of a pixel (x, y) of the PB of the chroma component of the CDB; P(−1, y) is a reconstructed sample of a pixel located at row y and neighbouring the left boundary; f(x) is a horizontal filtering coefficient of a reference pixel P(−1, y) of the pixel (x, y); and P(x, y) is an original prediction sample of the pixel (x, y).

6. The method of claim 5, wherein the horizontal filtering coefficient is determined based on a first parameter set; and the first parameter set comprises a size of the PB of the chroma component and a distance between the pixel (x, y) and the pixel (−1, y).

7. A method for decoding a picture, comprising:

parsing a bitstream, and determining a luma component intra prediction mode and a chroma component intra prediction mode of a Current Decoding Block (CDB), wherein the chroma component intra prediction mode is enhanced Two Step Cross-component Prediction Mode (TSCPM);

when the chroma component intra prediction mode indicates using a luma component of the CDB to determine a prediction value of a chroma component of the CDB, determining a Prediction Block (PB) of the chroma component of the CDB according to the luma component intra prediction mode; and after the enhanced TSCPM, performing refinement on the PB of the chroma component of the CDB, to obtain a refined PB of the chroma component of the CDB, wherein performing refinement on the PB of the chroma component of the CDB comprises:

determining a filter according to the chroma component intra prediction mode; and filtering the PB of the chroma component of the CDB by using the filter;

wherein determining the filter according to the chroma component intra prediction mode comprises:

when the chroma component intra prediction mode is a TSCPM_L, the filter is a second filter, wherein the second filter is configured to filter a pixel region neighbouring an upper boundary of the PB of the chroma component of the CDB and a pixel region of the PB of the chroma component of the CDB, wherein the second filter comprises a second two-tap filter; and the second two-tap filter satisfies:

$$P'(x,y)=f(y) \cdot P(x,-1)+f(y)) \cdot P(x,y)$$

wherein x and y are coordinates of the current pixel; a value of x does not exceed a value range of a width of the CDB, and a value of y does not exceed a value range of a height of the CDB; P'(x, y) is a final prediction sample of a pixel (x, y) of the PB of the chroma component of the CDB; P(x, −1) is a reconstructed sample of a pixel located at an column x and neighbouring the upper boundary; f(y) is a vertical filtering coefficient of a reference pixel P(x, −1) of the pixel (x, y); and P(x, y) is an original prediction sample of the pixel (x, y).

8. The method of claim 7, wherein the vertical filtering coefficient is determined by means of a second parameter set; and the second parameter set comprises a size of the PB of the chroma component and a distance between the pixel (x, y) and the pixel P(x, −1).

* * * * *